(12) United States Patent
Leising et al.

(10) Patent No.: US 10,506,015 B2
(45) Date of Patent: Dec. 10, 2019

(54) HVAC EQUIPMENT PROVIDING A DYNAMIC WEB INTERFACE SYSTEMS AND METHODS

(71) Applicant: Johnson Controls Technology Company, Plymouth, MI (US)

(72) Inventors: Daniel F. Leising, New Berlin, WI (US); Justin J. Seifi, Cedarburg, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 603 days.

(21) Appl. No.: 15/146,660

(22) Filed: May 4, 2016

(65) Prior Publication Data

US 2016/0327296 A1 Nov. 10, 2016

Related U.S. Application Data

(60) Provisional application No. 62/156,849, filed on May 4, 2015.

(51) Int. Cl.
*H04L 29/08* (2006.01)
*F24F 11/54* (2018.01)
(Continued)

(52) U.S. Cl.
CPC .............. *H04L 67/02* (2013.01); *H04L 67/12* (2013.01); *F24F 11/54* (2018.01); *F24F 11/58* (2018.01);
(Continued)

(58) Field of Classification Search
CPC . F24F 11/54; F24F 11/58; F24F 11/30; H04L 41/20; H04L 41/14; H04L 41/22; H04L 41/04; H04L 41/06; H04L 41/32; H04L 41/08; H04L 67/02; H04L 67/12; H04L 43/08; H04W 8/22; G06F 1/3203;
(Continued)

(56) References Cited

U.S. PATENT DOCUMENTS

2009/0057427 A1* 3/2009 Geadelmann .......... G05B 15/02
236/51
2010/0241275 A1* 9/2010 Crawford ........... G05D 23/1917
700/276

(Continued)

OTHER PUBLICATIONS

U.S. Appl. No. 14/694,675, filed Apr. 23, 2015, Johnson Controls Technology Company.

(Continued)

*Primary Examiner* — Jungwon Chang
(74) *Attorney, Agent, or Firm* — Foley & Lardner LLP

(57) ABSTRACT

A controller for a rooftop air handling unit includes control logic configured to generate a control signal for the HVAC device using values for one or more variables monitored by the controller. The controller includes an equipment model that links specific instances of data objects to the variables used by the control logic and a view definition that identifies one or more of the data objects. The controller includes a web server configured to dynamically generate a web portal that includes one or more of the data objects identified by the view definition. The controller includes a communications interface that provides the web portal to a client device.

18 Claims, 15 Drawing Sheets

(51) Int. Cl.
  *F24F 11/58* (2018.01)
  *H04L 12/26* (2006.01)
  *H04L 12/24* (2006.01)
  *G05B 13/04* (2006.01)

(52) U.S. Cl.
  CPC ...... *G05B 13/04* (2013.01); *G05B 2219/2614* (2013.01); *H04L 41/22* (2013.01); *H04L 43/08* (2013.01)

(58) Field of Classification Search
  CPC ........... G05D 23/1917; G05D 23/1928; G05B 2219/2614; G05B 13/04
  USPC .................................. 700/276; 709/223–224
  See application file for complete search history.

(56) References Cited

U.S. PATENT DOCUMENTS

| | | | | |
|---|---|---|---|---|
| 2015/0241856 | A1* | 8/2015 | Walser | F24F 11/30 700/275 |
| 2015/0293508 | A1 | 10/2015 | Piaskowski et al. | |
| 2015/0378373 | A1* | 12/2015 | Sprinkle | G05D 23/1917 700/276 |
| 2016/0061693 | A1* | 3/2016 | Salsbury | F24F 11/30 702/182 |
| 2016/0161139 | A1* | 6/2016 | Asmus | G05D 23/1928 165/208 |
| 2016/0313751 | A1* | 10/2016 | Risbeck | G05D 23/1917 |
| 2016/0313752 | A1* | 10/2016 | Przybylski | G05D 23/1917 |
| 2016/0327296 | A1* | 11/2016 | Leising | H04L 67/12 |

OTHER PUBLICATIONS

U.S. Appl. No. 14/863,219, filed Sep. 23, 2015, Johnson Controls Technology Company.
U.S. Appl. No. 15/179,894, filed Jun. 10, 2016, Johnson Controls Technology Company.
U.S. Appl. No. 62/329,171, filed Apr. 28, 2016, Johnson Controls Technology Company.
U.S. Appl. No. 62/329,174, filed Apr. 28, 2016, Johnson Controls Technology Company.
U.S. Appl. No. 62/330,854, filed May 3, 2016, Johnson Controls Technology Company.
U.S. Appl. No. 62/331,415, filed May 3, 2016, Johnson Controls Technology Company.

* cited by examiner

Widgets ▶ Faults Status Summary Commissioning Controller Details Self Test Results Trend Active Faults

1300

Number of active faults: 3

Fault 1 — 1302
Fault 2 — 1304
Fault 3 — 1306

Back

FIG. 13

Widgets ▶ Faults Status Summary Commissioning Controller Details Self Test Results Trend Fault Detail — 1400

| Fault Text | Timestamp | Severity |
|---|---|---|
| Outputs Disabled Due to Low Input V | 2015-03-12 01:23:45 | Critical |

1402  1404  1406

Back

FIG. 14

HVAC EQUIPMENT PROVIDING A DYNAMIC WEB INTERFACE SYSTEMS AND METHODS

CROSS-REFERENCE TO RELATED APPLICATIONS

This application claims the benefit of and priority to U.S. Provisional Patent Application No. 62/156,849, filed May 4, 2015, the entirety of which is incorporated by reference herein.

BACKGROUND

The present invention relates generally to monitoring and control interfaces for HVAC equipment. The present invention relates more particularly to systems and methods for providing a dynamic web interface for HVAC equipment.

Conventional monitoring and control interfaces are generated by a computer system that receives data points from HVAC equipment. For example, a user device may include interface software configured to receive data points and generate an interface that presents the data points to a user. In order for the interface to be used, the interface software must be installed on the user device. Web interfaces are a type of interface that do not require specialized software to use, other than a common web browser. However, web interfaces are often difficult to generate and/or customize to particular HVAC devices. It would be desirable to provide an interface for HVAC equipment that overcomes these and other disadvantages of existing systems.

SUMMARY

One implementation of the present disclosure is a controller for a rooftop air handling unit. The controller includes control logic configured to generate a control signal for the HVAC device using values for one or more variables monitored by the controller. The controller includes an equipment model that links specific instances of data objects to the variables used by the control logic and a view definition that identifies one or more of the data objects. The controller includes a web server configured to dynamically generate a web portal that includes one or more of the data objects identified by the view definition. The controller includes a communications interface that provides the web portal to a client device.

Another implementation of the present disclosure is a method of communicating with an HVAC device. The method includes receiving a data request at a communication interface of a controller of the HVAC device. The method further includes decrypting a data request using a webserver, the webserver located in the controller. The method further includes processing the data request using an HTTP server integration library within a processing circuit of the controller, the HTTP server integration library invoking one or more Common Gateway Interface scripts to process the received data request. The method further including encrypting the processed data at the communication interface. The method further including transmitting the processed data to a client device.

Another implementation of the present disclosure is an HVAC controller configured to generate a dynamic web portal. The HVAC controller includes a processing circuit including a processor and memory, wherein the memory includes an object engine. The object engine includes a control logic configured to generate a control signal for the HVAC controller using values for one or more variable monitored by the controller. The object engine further includes a plurality of data objects and an equipment model that links the data objects to the variable used by the control logic. The object engine further includes a view definition that identifies one or more of the data objects. The HVAC controller further includes a web server configured to dynamically generate the web portal, the web portal including one or more of the data objects identified by the view definition. The HVAC controller further includes a plurality of Common Gateway Interface scripts and a communication interface that transmits the web portal to a client device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 13-14 are renderings of a fault viewer page of the web portal of FIG. 7, according to an exemplary embodiment.

DETAILED DESCRIPTION

Figure 1:
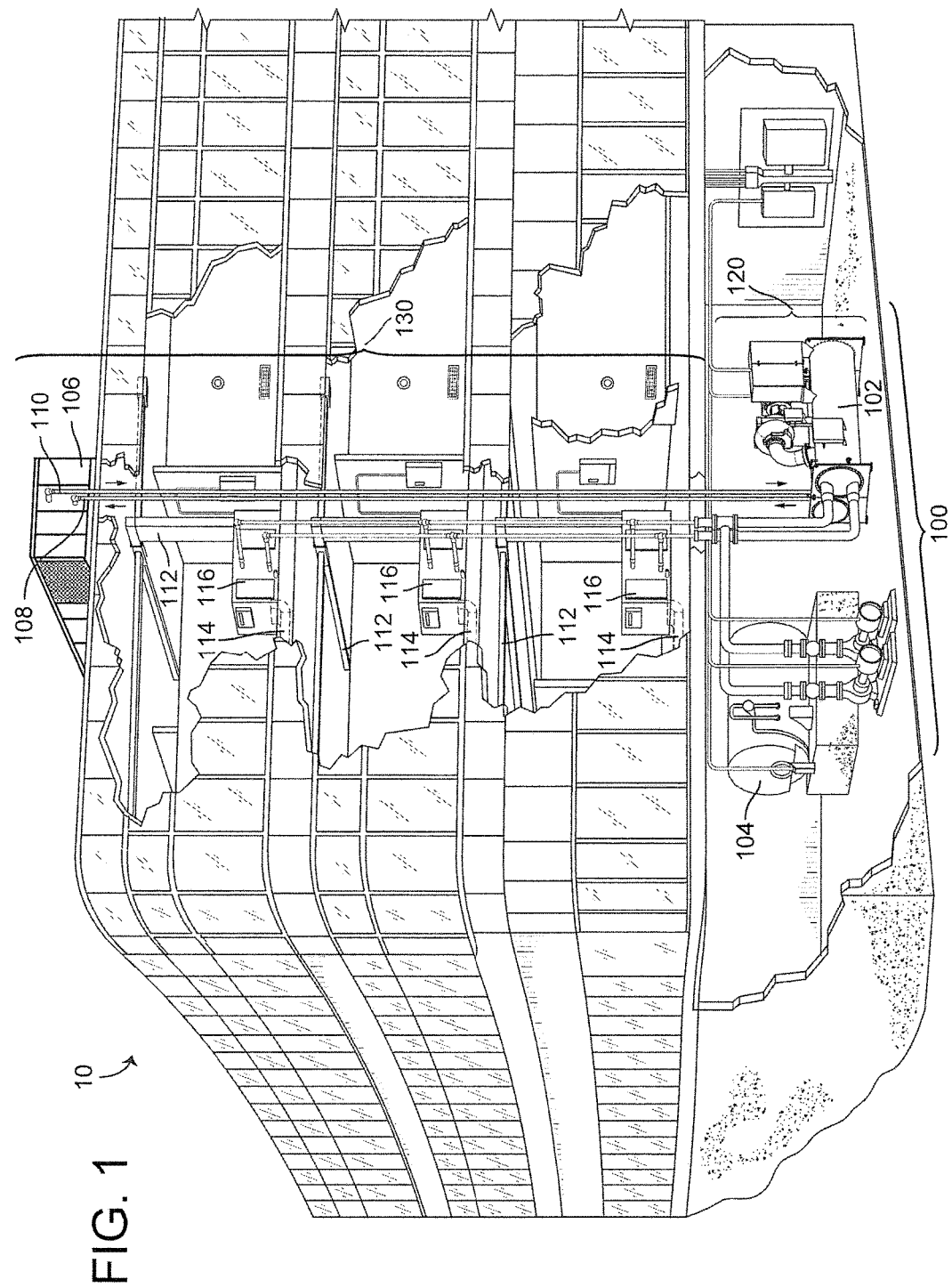
FIG. 1 is a perspective view of a building equipped with a HVAC system, according to an exemplary embodiment.

Referring generally to the FIGURES, systems and methods for providing a dynamic web interface for HVAC equipment are shown, according to an exemplary embodiment. The systems and methods described herein may be used to generate a user interface that can be rendered by a web browser (i.e., a web interface) and presented on a client device. The web interface may facilitate monitoring, controlling, commissioning, or otherwise interacting with HVAC equipment through a web browser running on the client device. The web interface may be generated by a web server running on a HVAC device. For example, the HVAC device may include a web server that dynamically generates a webpage and provides the webpage to a client device. The webpage may be coded in any of a variety of webpage formats (e.g., HTML, CSS, JavaScript, etc.). The client device may view the webpage using a web browser.

In some embodiments, the webpage facilitates commissioning the HVAC device. For example, the webpage may allow a technician to enter or select configuration parameters that are communicated back to the HVAC device and stored within the memory of the HVAC device. The HVAC device may then use the updated parameters during operation.

Advantageously, the webpage may be generated dynamically based on a stored equipment model for the HVAC device. The equipment model may define and/or describe particular instances of data objects (e.g., data point objects, control parameter objects, etc.) that are used by the HVAC device during operation. For example, the equipment model may define a particular data object as a measured temperature and another data object as a setpoint. The control logic for the HVAC device may use the equipment model to identify particular data points that are relevant to the operation of the HVAC device. Similarly, the web server may use the equipment model to identify particular data points to provide via the web interface.

In some embodiments, the HVAC device stores a view definition file that identifies a subset of the data objects defined by the equipment model. The view definition may be based on the type of HVAC device (e.g., chiller controller, valve controller, etc.). The web server may use the view definition to dynamically select a subset of the stored data objects for inclusion in the webpage generated by the web server. In some embodiments, the HVAC device stores scripts, such as Common Gateway Interface (CGI) scripts. The web server may use the scripts to dynamically modify the content of the webpage based on the view definition.

Advantageously, the configuration of the web server and scripts allows the web server to generate a web portal in which none of the data presented via the web portal is hardcoded. For example, all of the data presented via the web portal (e.g., data points, navigation links, etc.) may be generated from the scripts dynamically. The data shown in the web portal may be based on the data objects stored in the controller, as defined by the view definition file. This allows the point values presented via the web portal to automatically change if the points on the controller change and/or if the view definition file is changed. Advantageously, this feature allows for the web interface to adapt to different types of devices without changing any features of the web server.

The view definition file may define which of the data points are shown in the web interface. Moreover, since the view definition file is used, points can be dynamically hidden and shown to the user based on the current settings of the controller, even as the user is commissioning the device. For example, if the user chooses to enable economizer control, all of the points related to configuring economizer control (that were previously hidden) may appear automatically in the web interface, as well as any other connected user interface. Additional advantages and features of the present invention are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
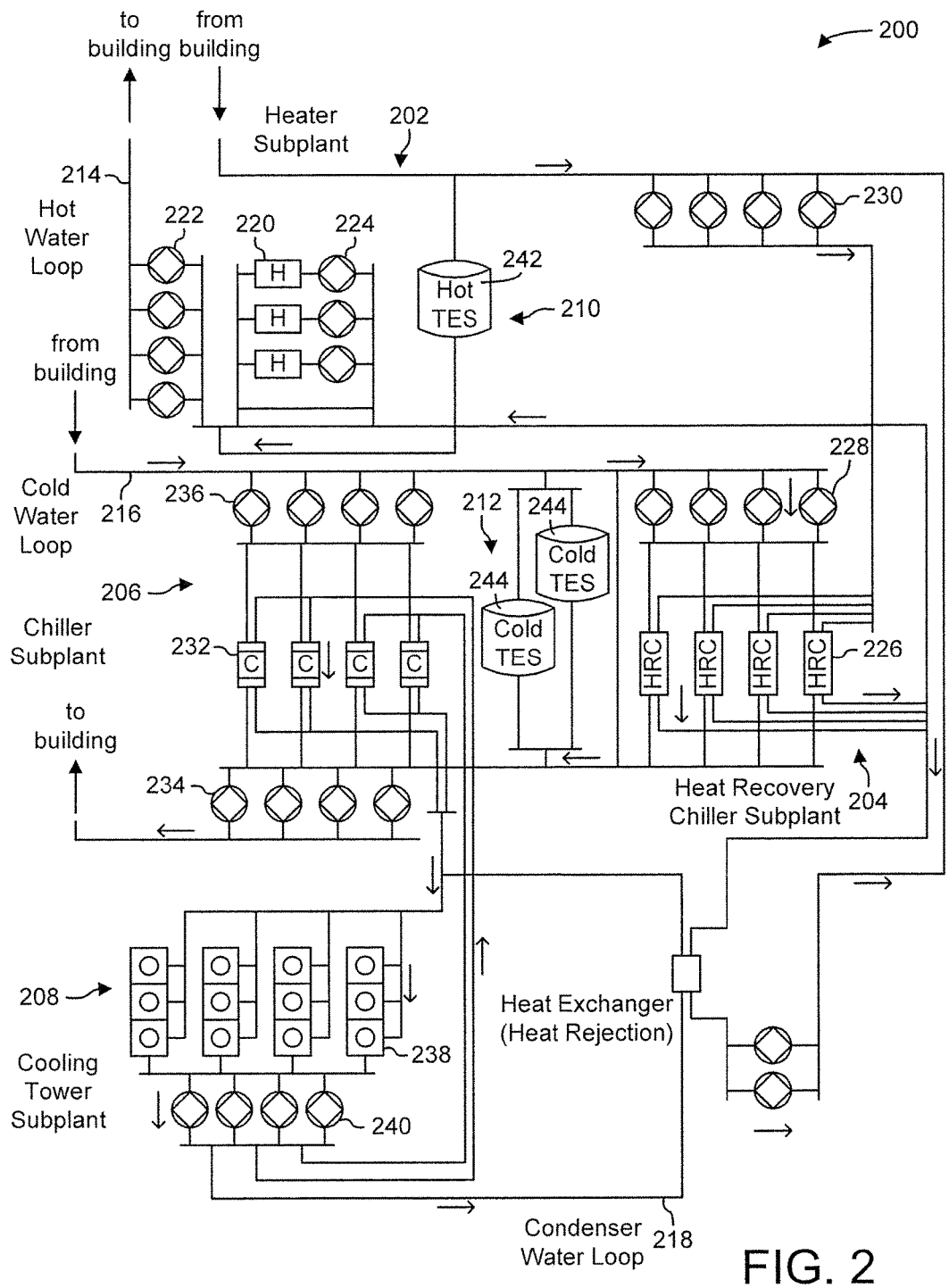
FIG. 2 is a schematic diagram of a waterside system which may be used in conjunction with the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
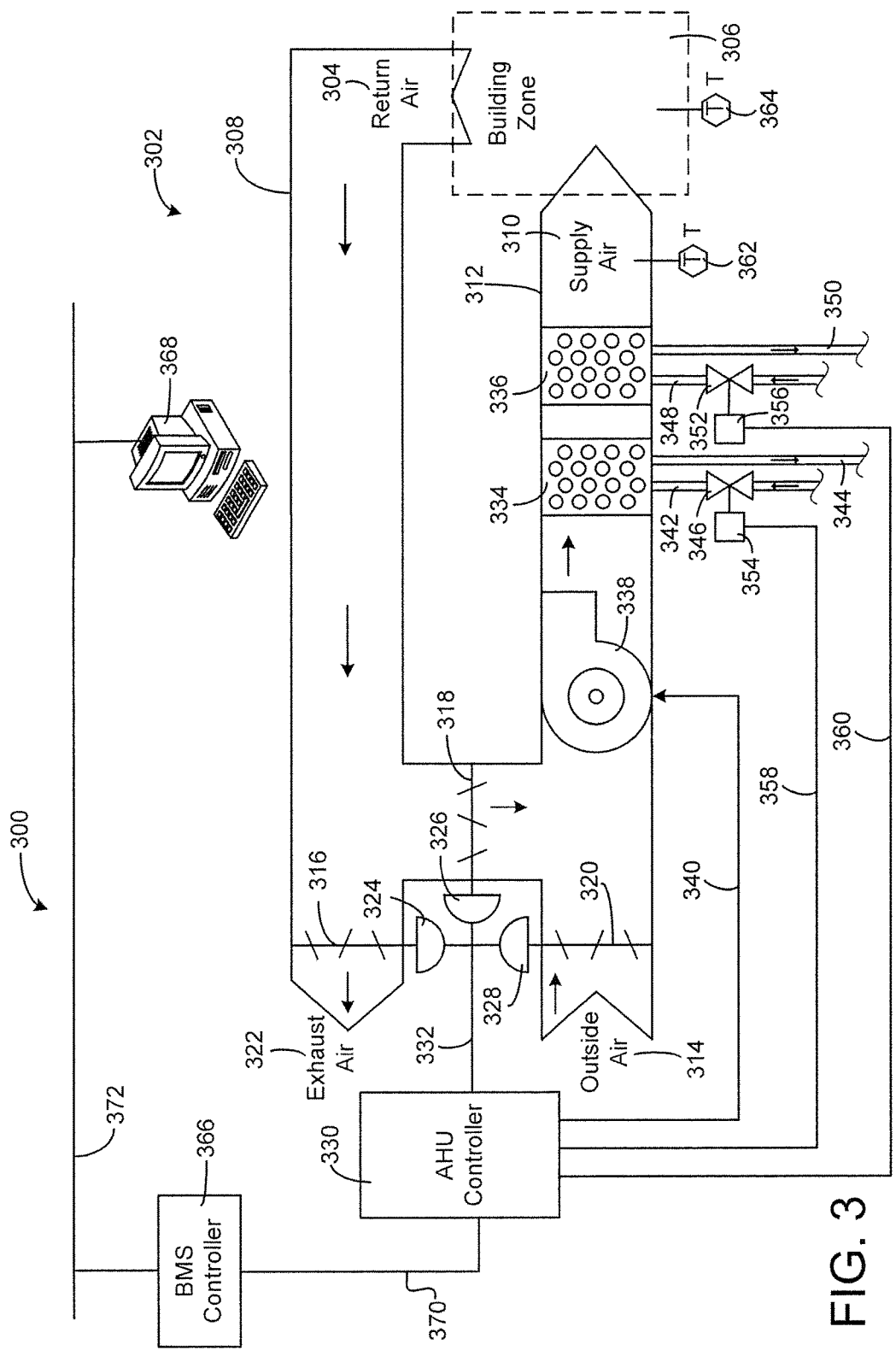
FIG. 3 is a schematic diagram of a waterside system which may be used in conjunction with the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
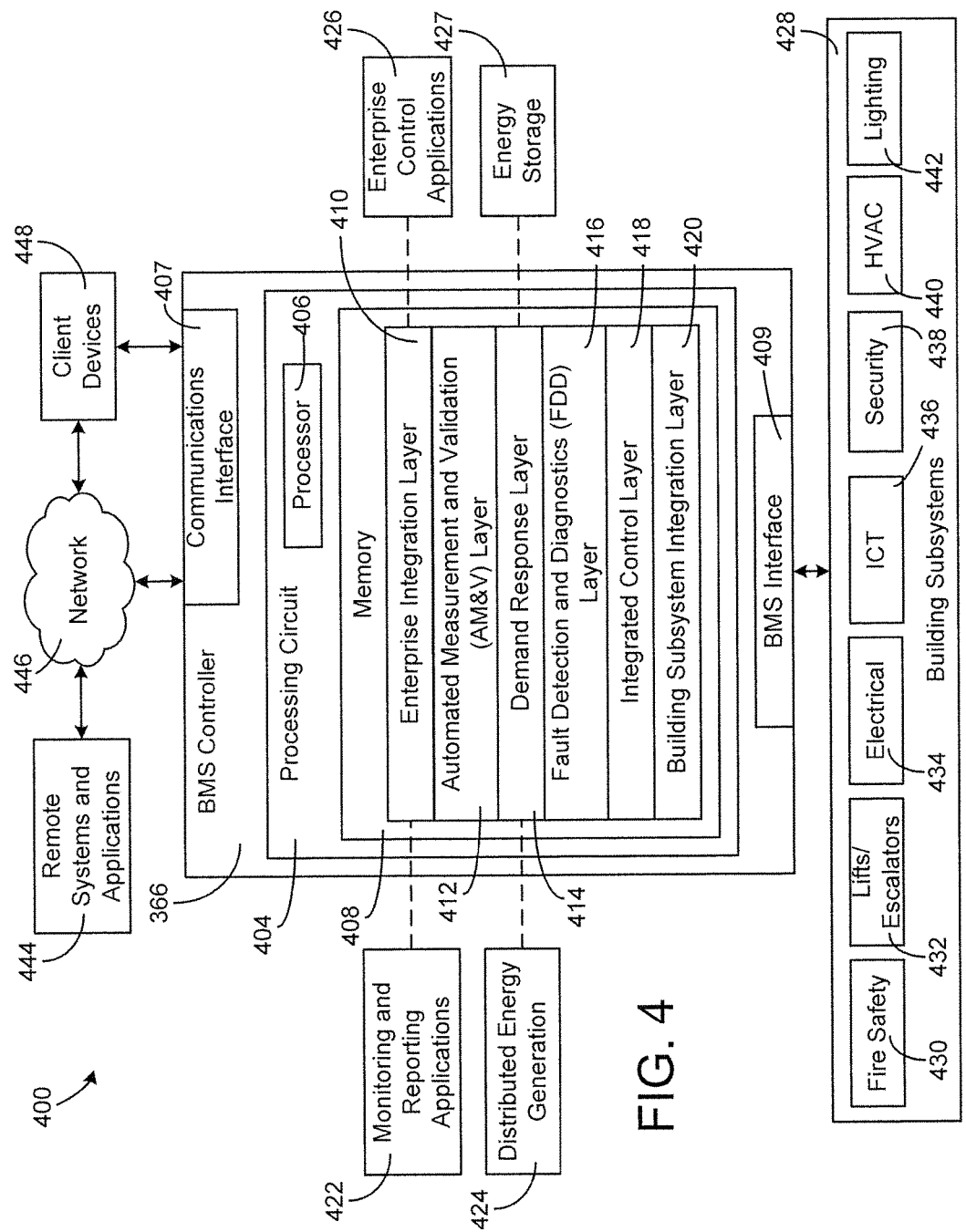
FIG. 4 is a block diagram of a building management system (BMS) which may be used in conjunction with the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Dynamic Web Interface

Figure 5:
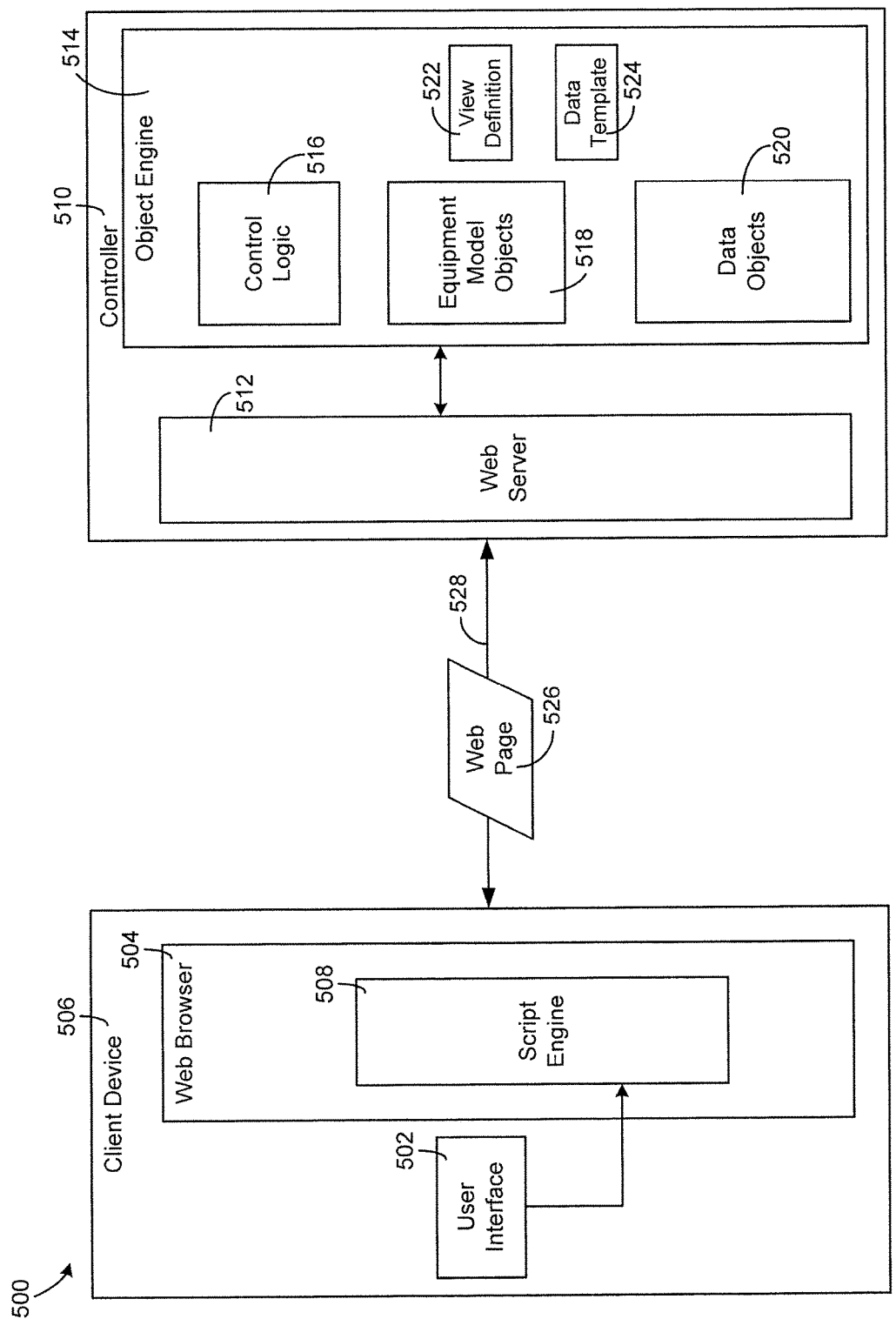
FIG. 5 is a block diagram of a system for providing a dynamic web interface for HVAC equipment, according to an exemplary embodiment.

Referring now to FIG. 5, a system 500 for providing a dynamic web interface for HVAC equipment is shown, according to one embodiment. The system 500 can include a user interface 502 and a web browser 504 within a client device 506. The web browser 504 may be any of a variety of web browsers configured to render webpages (e.g., HTML webpages), and run scripts that allow the webpages to be dynamically configured. For example, the web browser 504 is shown to include the script engine 508 configured to run scripts (e.g., JavaScript, Common Gateway Interface (CGI) script, etc.) received from the web server 512 of the controller 510. The user interface 502 may include any number and/or type of user interface devices (e.g., electronic displays, keyboards, touch-sensitive displays, speakers, buttons, etc.) configured to facilitate user interaction with the client device. In some embodiments, the client device 506 is a mobile computing device (e.g., a smartphone, a tablet, a laptop, a PDA, etc.). In other embodiments, the client device is a stationary computing device (e.g., a desktop computer, a workstation, a server, etc.). In one example, system 500 may be configured to generate the user interface 502 via the web browser 504 (i.e., a web interface) to be presented on the client device 506. The user interface 502 may facilitate monitoring, controlling, commissioning, or otherwise interacting with HVAC, or other BMS equipment through the web browser 504 running on the client device 506.

The system 500 can further include a controller 510. In one embodiment, the controller is an HVAC controller. However, the controller 510 can be any device controller associated with a BMS, as discussed above. For example, the controller 510 can be an RTU controller, an AHU controller, or an overall BMS controller, as described above. The controller 510 can include a webserver 512 and an object engine 514. The object engine 514 can further include a control logic module 516, one or more equipment model objects 518, one or more data objects 520, a view definition file 522, and data templates 524.

In one embodiment, the web browser 504 renders a webpage 526 generated by the web server 508 running on the controller 510. For example, the web server 508 of the controller 510 can dynamically generate the webpage 526 and provide the webpage 526 to the web browser 504 of the client device 506. The webpage 526 may be coded in any of a variety of webpage formats (e.g., HTML, CSS, JavaScript, etc.). The web server 512 can be a lightweight web server, such as where the controller 510 is associated with a single, and/or simple device such as a valve or actuator. The web server 512 can further be a heavyweight web server. For example, where the controller 510 is an HVAC controller for controlling an HVAC system (e.g. AHU, RTU, etc.), a heavier-weight web server 512 may be required to handle the increased data associated with the HVAC system. Additionally, the web server 512 can be a super-heavyweight web server, such as where the controller is a BMS controller for controlling an entire BMS. A user may view the webpage 526 on the user interface 502 of the client device 506 using the web browser 504.

Advantageously, the webpage 526 may be generated dynamically based on the stored equipment model objects 518 for the HVAC device that are used by the controller 510 during operation. The equipment model objects 518 may define and/or describe particular instances of the data objects 520. In one embodiment, the data objects 520 include data point objects, control parameter objects, etc. For example, the equipment model objects 518 may define a particular data object 520 as a measured temperature and another data object 520 as a setpoint. The control logic module 516 for the controller 510 may use the equipment model objects 518 to identify particular data points that are relevant to the operation of the controller 510. Similarly, the web server 512 may use the equipment model objects 518 to identify particular data points to provide via the webpage 526.

In some embodiments, the controller 510 stores the view definition file 522 that identifies a subset of the data objects 520 defined by the equipment model objects 518. The view definition file 522 may be based on the type of controller 510 (e.g., chiller controller, valve controller, etc.) and may identify a subset of data objects 520 that are core to the functionality of the controller 510. For example, the view definition file 522 for a chiller controller may identify the chiller outlet temperature as an important data point; however, the view definition file 522 for a valve controller may not identify such a data point as important to the operation of the valve. The web server 512 may use the view definition file 522 to dynamically select a subset of the stored data objects 520 for inclusion in the webpage 526 generated by the web server 512.

In some embodiments, the controller 510 is a controller for HVAC equipment (e.g., a chiller controller, an AHU controller, a subplant controller, etc.). In other embodiments, the controller 510 is a controllable HVAC device (e.g., a chiller, a fan, a pump, a heater, a cooling tower, etc.). Although the present invention is described primarily with respect to HVAC devices, it should be understood that the systems and methods described herein can be used in conjunction with any type of equipment or device (e.g., HVAC equipment, lighting equipment, security equipment, electrical equipment, etc.). For example, any type of equipment or device may be adapted to run a web server that facilitates user interaction with the equipment or device.

As described above, the controller 510 is shown to include a control logic module 516. The control logic module 516 may include closed loop control, feedback control, PI control, model predictive control, or any other type of automated control methodology to control a variable affected by operation of an HVAC device associated with the controller 510 (e.g., a temperature within a building). The control logic module 516 may use the equipment model objects 518 to identify data objects 520 stored within the object engine 514 that represent inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.), or other data objects 520 that are relevant to the control methodology used by the controller 510. The control logic module 516 may use the values provided by the identified data objects 520 as inputs to a control algorithm to determine an output for one or more building control devices (e.g., dampers, air handling units, chillers, boilers, fans, pumps, etc.) associated with the controller 510 in order to affect a variable state or condition monitored by the controller 510.

Still referring to FIG. 5, the client device 506 uses the web browser 504 to request a webpage 526 from the controller 510 via a communication interface 528. In one embodiment, the communication interface 528 is a wireless interface (e.g. WiFi, Bluetooth, LoRa, Zigbee, etc.) The communication interface 528 can also be a wired interface, such as Ethernet (TCP/IP), universal serial bus (USB), serial (RS-485, RS-232), etc. The web server 512 running on the controller 510 responds to the request by returning the webpage 526 to the client device 506. The webpage 526 may include static code (e.g., HTML code), images, and/or scripts that allow the webpage 526 to be dynamically configured. For example, the scripts may be provided to the script engine 508 that operates on the client device 506. In one example, the script engine 508 runs the scripts and can request a navigation tree from the web server 512 via the communication interface 528. The navigation tree may define a top level view that is displayed on the webpage 526. Such a view may be dependent on the equipment model objects 518 for the controller 510, and may be different for different types of HVAC devices. For example, the top level view for a chiller may include different types of monitoring/control options than the top level view for an AHU. An exemplary top level view for an AHU is described in greater detail with reference to FIG. 7.

The web server 512 may request the top level view from the equipment model objects 518. The equipment model objects may refer to the view definition file 522, which can define the top level view for the controller 510. The view definition file 522 may be different for various types of HVAC devices. The equipment model object 518 can then return the top level view to the web server 512. The web server 512 then sends the top level view to the web browser 504 running on the client device 506 using the communication interface 528. The web browser 504 may then use the top level view to dynamically generate the webpage 526.

The client device 506 may present the webpage 526 via the user interface 502. The webpage 526 may include one or more selectable objects (e.g., hyperlinks) which can allow a user to select a particular item (e.g., controller status, detected faults, control settings, commissioning information, etc.) to view in greater detail. The script engine 508 may receive a user selection from the user interface 502. The script engine 508 may determine the identity of the item selected by the user and submit a request to the web server 512 for additional information related to the user selection via the communication interface 528. For example, the script engine 508 may request data points from the web server 512. The data points may include values for one or more variables or parameters used by the controller 510 (e.g., measured variables, setpoints, operating mode, commissioning information, etc.).

The controller 510 may use the equipment model objects 518 to identify particular data objects 520 that correspond to the requested data points. In some embodiments, the equipment model objects 518 refer to the view definition file 522 to determine a subset of the data objects 520 (i.e., groups, views, etc.) that should be provided to the client device 506. Further, the equipment model objects 518 may refer to the data template 524 to determine a format of the data to be displayed. In one embodiment, the data template 524 contains generic data information for a given device, such as controller 510. The controller 510 may access the object engine 514 to retrieve the requested data points and provide the requested data points to the client device 506. The web browser 504, running on the client device 506, uses the returned data points, groups, and views to dynamically generate another webpage 526 that provides a more detailed view of the selected item. Several examples of such webpages are described in greater detail with reference to FIGS. 7-14.

In some embodiments, the webpages 526 facilitate commissioning the controller 510 (or any other device). For example, the webpages 526 may allow a technician to enter or select configuration parameters that are communicated back to the controller 510 and stored within a memory of the controller. The controller 510 may then use the updated parameters during control operations.

Figure 6:
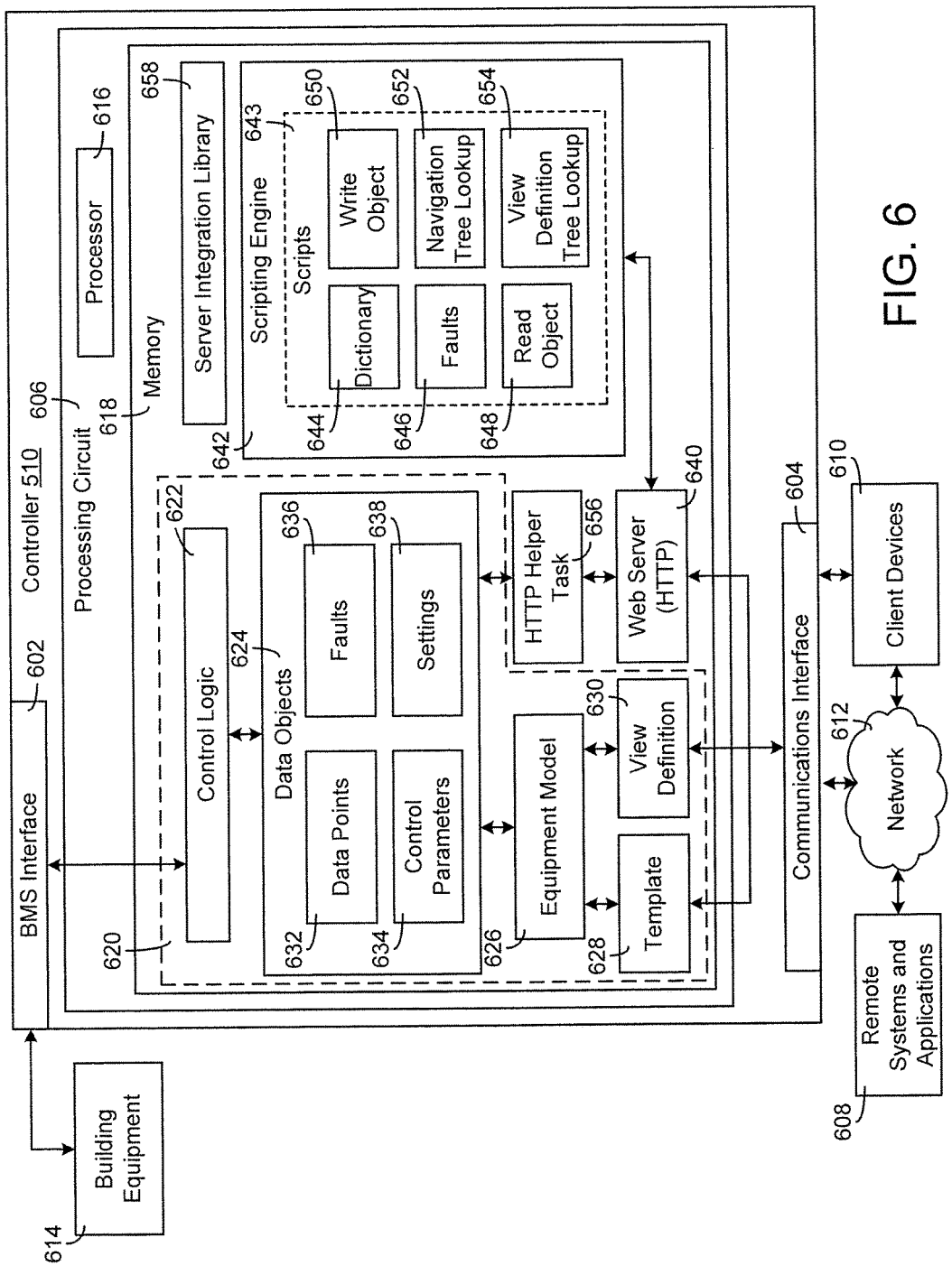
FIG. 6 is a block diagram illustrating a controller which may be used in the system of FIG. 5, according to an exemplary embodiment.

Referring now to FIG. 6, a block diagram illustrating the controller 510 of FIG. 5 in greater detail is shown, according to one embodiment. The controller 510 is shown to include a BMS interface 602, a communications interface 604, and a processing circuit 606. The communications interface 604 may facilitate communications between the controller 510 and one or more remote systems and applications 608 (e.g., monitoring and reporting applications, enterprise control applications, applications residing on client devices, etc.). The communications interface 606 may also facilitate communications between the controller 510 and one or more client devices 610. Such communications may be direct (e.g., via a direct WiFi connection, NFC, Bluetooth, etc.) or via a communications network 612. The BMS interface 602 may facilitate communications between the controller 510 and the building equipment 614 controlled by the controller 510 (e.g., HVAC equipment, lighting equipment, security equipment, etc.).

The BMS interface 602 and the communications interface 604 may include wired or wireless communications interfaces (e.g., jacks, antennas, transmitters, receivers, transceivers, wire terminals, etc.) for conducting data communications with building equipment or other external systems or devices. In various embodiments, the communications may be direct (e.g., local wired or wireless communications) or via a communications network 612 (e.g., a WAN, the Internet, a cellular network, etc.). For example, the interfaces 602, 604 may include an Ethernet card and port for sending and receiving data via an Ethernet-based communications link or network. As another example, the interfaces 602, 604 can include a WiFi transceiver, a cellular transceiver, or a mobile phone transceiver for communicating via a wireless communications network. In some embodiments, the communications interface 604 includes an Ethernet interface and/or a WiFi interface.

Still referring to FIG. 6, the processing circuit 606 is shown to include a processor 616 and memory 618. The processing circuit 606 may be communicably connected to the BMS interface 602 and/or the communications interface 604 such that the processing circuit 606 and the various components thereof can send and receive data via the interfaces 602, 604. The processor 616 can be implemented as a general purpose processor, an application specific integrated circuit (ASIC), one or more field programmable gate arrays (FPGAs), a group of processing components, or other suitable electronic processing components.

The memory 618 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory 618 may be or include volatile memory or non-volatile memory. The memory 618 may include database components, object code components, script components, or any other type of information structure for supporting the various activities and information structures described in the present application. According to one embodiment, the memory 618 is communicably connected to the processor 616 via the processing circuit 606 and includes computer code for executing (e.g., by the processing circuit and/or the processor) one or more processes described herein.

Still referring to FIG. 6, the controller 510 is shown to include an object engine 620 within the memory 618. The object engine 620 includes control logic 622, data objects 624, an equipment model 626, data templates 628 and a view definition file 630. The control logic 622 may include closed loop control, feedback control, PI control, model predictive control, or any other type of automated control methodology to control a variable affected by operation of an associated HVAC device (e.g., a temperature within a building). The control logic 622 may use the equipment model 626 to identify particular data objects 624 for use in the control operations defined in the control logic 622. The control logic 622 may use the values provided by the identified data objects as inputs to a control algorithm to determine an output for one or more building control devices (e.g., dampers, air handling units, chillers, boilers, fans, pumps, etc.) in order to affect a variable state or condition monitored by the controller 510.

The data objects 624 are shown to include data points 632, control parameters 634, faults 636, and settings 638. The data points 632 may include measured or calculated values for one or more variables monitored or controlled by the controller 510. For example, the data points 632 may include inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.), automated inputs from external systems or devices, calculated values, and/or any other variable that is relevant to the control methodology used by the controller 510. In some embodiments, the data points 632 contains BACnet object instances that may be created on the controller 510.

The control parameters 634 may include fixed or variable parameters that are used by the controller 510 to determine an appropriate control output. For example, the control parameters 634 may include proportional gain values, integral gain values, regression model coefficients, a specified operating mode, or any other parameter that affects the outputs provided by the controller 510. The faults 636 may include one or more errors, warning messages, failures, or other types of faults that have been detected during operation of the controller 510. Further, the faults 636 may include parameter and time series faults, as well fault detection logic. Additionally, the faults 636 can include faults provided by devices connected to the controller 510, such as sensors, actuators, valves, and other BMS devices. The settings 638 may include various programmable settings (e.g., device ID, security settings, encryption settings, etc.) that can be adjusted by a user. Data objects 624 may be stored as floating values, enumerated values, text strings, and/or any other type of data format.

The equipment model 626 may define and/or describe particular instances of data objects 624 that are used by the controller 510 during operation. For example, the equipment model 626 may define a particular data object 624 as a measured temperature and another data object 624 as a setpoint. In some embodiments, the equipment model 626 is the same or similar to the equipment model 626 or data model described in U.S. patent application Ser. No. 14/694,675, titled "Building Management System with Linked Thermodynamic Models for HVAC Equipment" and filed Apr. 23, 2015, the entire disclosure of which is incorporated by reference herein.

The control logic 622 may use the equipment model 626 to identify particular data points that are relevant to the operation of the controller 510. Similarly, a web server 640 may use the equipment model 626 to identify particular data points 632 to provide via a web interface. In some embodiments, the equipment model 626 also contains BACnet object instances to create on the controller 510. These object instances may be used to highlight important data objects 624 rather than for control logic directly. The data objects 624 that are highlighted may be defined by the data template file 628.

In some embodiments, the equipment model 626 includes presence indication rules that define whether various data objects 624 should be shown or hidden in the web interface. The presence indication rules may allow entire groups of data objects 624 to be hidden or disappear if the current settings on the controller 510 make the data objects 624 irrelevant to the operation of the controller 510. The data objects 624 may be shown or reappear if the presence indication rules change or if the settings on the controller 510 change such that the data objects 624 become relevant to the operation of the controller 510.

The template file 628 may include a collection of data objects for a piece of equipment that represent the core functionality of the equipment. The template file 628 may be based on the type of equipment. For example, the template file 628 for a chiller controller may identify the chiller outlet temperature as an important data object; however, the template file 628 for a valve controller may not identify the such a data object as important to the operation of the valve. The template file 628 may identify which of the data objects 624 are important and the equipment model may tie specific instances of the data objects 624 to those points listed in the template file 628.

The view definition file 630 may identify a subset of the data objects 624 listed in the equipment model 626. The data objects 624 listed in the view definition file 630 may be included in a webpage generated by a web server 640 and provided to the client device 610. The view definition file 630 may group the data objects 624 differently than the equipment model 626. For example, the view definition file 630 may group the data objects 624 in a manner that is intuitive for a user attempting to commission, monitor, or control a device via a web interface generated by the web server 640. The web server 640 may use the view definition file 630 to dynamically select a subset of the stored data objects 624 for inclusion in a webpage generated by the web server 640.

In some embodiments, the web server 640 is a modified Unison HTTP server. The web server 640 may include SSL support for secure connections and the ability for CGI scripts to define their own HTTP status codes. The web server 640 may include support for HTTP authentication (e.g., using a Unison security/login module) as well as support for HTTP 0.9, 1.0, and 1.1. The web server 640 may support dynamic content via CGI scripts (e.g., written in C or any other scripting language) and may support multiple and simultaneous connections by clients. In some embodiments, the web server 640 is configured to make clients cache results with a "304 Not Modified" message and may support sending compressed data via the communications interface 604.

The web server 640 may be configured to interface with the other components of the controller 510 (e.g., natively or via CGI scripts). For example, the web server 640 may be configured to read data from the data objects 624 and use the data to generate a webpage provided to the client device 610. The web server 640 may be configured to receive data from the client device 610 and write data to the data objects 624 based on the input received from the client device 610. The web server 640 may be configured to access the equipment model 626, the data template file 628, and/or the view definition file 630 to determine which of the data objects 624 to include in the generated webpage. The web server 640 may dynamically generate the webpage based on the information provided in the equipment model 626, the view definition file 630, and/or the data template file 628.

In some embodiments, the web server 640 uses a scripting engine 642 to perform some or all of the functions described above, using scripts 643. In one embodiment, the scripts 643 are Common Gateway Interface (CGI) scripts to perform some or all of the functions described herein. The scripting engine could further use other scripts such as JavaScript scripts. The scripting engine 642 may be stored within the memory 618 of the controller 510 and may provide the required scripts 643 to the client device 610 in conjunction with the webpage generated by the web server 640. In some embodiments, the web server 640 integrates the scripts 643 with the webpage and provides the integrated webpage (e.g., with embedded scripts 643) to the client device 610. The web browser running on the client device 610 may run the scripts 643 to request various types of data from the controller 510. In other examples, the web server 640 may execute the scripts 643 prior to providing the webpage to the client device 610.

The scripts 643 can include dictionary scripts 644, fault scripts 646, read object scripts 648, write object scripts 650, navigation tree lookup scripts 652 and view definition tree lookup scripts 654. The dictionary scripts 644 may be configured to lookup dictionary strings on the controller 510. The strings returned may be in whatever language the controller 510 is currently using. If a different language is desired, the language used by the controller 510 may be modified in the controller settings. Details of an example dictionary script 644 are provided in the following table:

| Dictionary Lookup Script | |
|---|---|
| Field | Description |
| Standard CGI script name | cgi-bin\dict.cgi |
| Main function name | WebUI_Dictionary_Read_Enum_Set |
| Parameters | "enumSet" -- Example: enumSet=1709 |
| | "enumValue" -- Example: enumValue=1. If not provided, then the entire contents of the enumeration set will be returned rather than a single value. |
| Example output | [{Enum_Set: 1709, Enum_Value: 1, String: "On"}, {Enum_Set: 1709, Enum_Value: 2, String: "Off"}] |
| Possible status codes | 200 OK -- Will receive output similar to example above. If enum set not found, then a blank array is returned with a 200 OK. |
| | 409 Conflict -- System in startup; script cannot yet be invoked. |
| | 400 Bad Request -- CGI parameters not satisfied |
| Supported HTTP Methods | GET |
| | Example: GET /cgi-bin/dict.cgi?enumSet=1709&enumValue=1 |

| Dictionary Lookup Script | |
| --- | --- |
| Field | Description |
| | POST<br>    Example: POST /cgi-bin/dict.cgi<br>        enumSet: 1709<br>        enumValue: 1 |

The faults script 646 may obtain information on all of the active faults in the system as recorded by the controller 510. This information may include a fault string text, a local time the fault became active, and/or a severity of the fault. Details of an example faults scripts 614 are provided in the following table:

| Fault Script | |
| --- | --- |
| Field | Description |
| Standard CGI script name | cgi-bin\faults.cgi |
| Main function name | WebUI_Faults_Read |
| Parameters | None |
| Example output | {NumFaults: 1, ActiveFaults: [{LongFaultText: "Some fault", Severity: 1, Timestamp: 1425497566}]} |
| Possible status codes | 200 OK -- Will receive example output above<br>400 Bad Request -- Invalid HTTP method<br>409 Conflict -- System in startup; script cannot yet be invoked.<br>500 Internal Server Error -- Resource or memory is unavailable |
| Supported HTTP Methods | GET<br>    Example: GET /cgi-bin/faults.cgi |

The read objects script 648 may attempt to read a data object 624 stored within the controller 510. The read objects script 648 may receive an object ID and an attribute and may read the specified attribute from the specified object. Details of an example read objects script 648 are provided in the following table:

| Read Objects Script | |
| --- | --- |
| Field | Description |
| Standard CGI script name | cgi-bin\oreRead.cgi |
| Main function name | WebUI_ORE_Point_Read |
| Parameters | "classId" -- Example: "classId=715"<br>"instance" -- Example: "instance=1"<br>"attr" -- Example: "attr=54"<br>"jciOid -- Example: "jciOid=1704" |
| Example output | Enumeration: {name: "715:1/54", unit: 23, writable: 1, status: 0, value: "On", rawString: "1686:0", rawValue: 0, rawSet: 1686, datatype: 9}<br>Float: {name: "715:1/54", unit: 23, writable: 1, status: 0, value: 40.3625, datatype: 4}<br>String: {name: "715:1/54", unit: 23, writable: 1, status: 0, value: "Some string", datatype: 7}<br>Unsigned short: {name: "715:1/54", unit: 23, writable: 1, status: 0, value: 5, datatype: 18}<br>Short: {name: "715:1/54", unit: 23, writable: 1, status: 0, value: 5, datatype: 17}<br>Unsigned long: {name: "715:1/54", unit: 23, writable: 1, status: 0, value: 5, datatype: 2}<br>Long: {name: "715:1/54", unit: 23, writable: 1, status: 0, value: 5, datatype: 3}<br>Byte: {name: "715:1/54", unit: 23, writable: 1, status: 0, value: 5, datatype: 16} |

-continued

| | Read Objects Script |
|---|---|
| Field | Description |
| | Bool: {name: "715:1/54", unit: 23, writable: 1, status: 0, value: 5, datatype: 1} |
| | Date: {name: "715:1/54", unit: 23, writable: 1, status: 0, value: "2015-03-04", datatype: 10} |
| | Time: {name: "715:1/54", unit: 23, writable: 1, status: 0, value: "14:03:00", datatype: 11} |
| Possible status codes | 200 OK -- Will receive output similar to the examples above |
| | 400 Bad Request -- Invalid required CGI parameters |
| | 409 Conflict -- System in startup; script cannot yet be invoked. |
| | 500 Internal Server Error -- Resource or memory is unavailable |
| Supported HTTP Methods | GET |
| | Example: GET /cgibin/oreRead.cgi?classId=715&instance=1&attr=54 |
| | POST |
| | Example: POST /cgi-bin/oreRead.cgi |
| | attr: 54 |
| | jciOid: 1071 |

The write objects script 650 may attempt to write a data value to a data object 624 stored within the controller 510. The write may be successful or unsuccessful due to any of a variety of circumstances (e.g., if the data object 624 does not exist, if the attribute is not writable, if the user interface does not have permission to write the attribute, etc.). Details of an example write objects script 650 are provided in the following table:

| | Write Objects Script |
|---|---|
| Field | Description |
| Standard CGI script name | cgi-bin\oreWrite.cgi |
| Main function name | WebUI_ORE_Point_Write |
| Parameters | "classId" -- Example: "classId=715" |
| | "instance" -- Example: "instance=1" |
| | "attr" -- Example: "attr=54" |
| | "jciOid -- Example: "jciOid=1704" |
| | "dataType" -- Example: "dataType=7" |
| | "value" -- Example: "value=63" |
| Example output | Success: {name: "715:1/54", status: 0} |
| | Failure: {name: "715:1/54", status: 33320} (Write access denied) |
| Possible status codes | 200 OK -- Will receive output similar to the examples above |
| | 400 Bad Request -- Invalid required CGI parameters |
| | 409 Conflict -- System in startup; script cannot yet be invoked. |
| | 500 Internal Server Error -- Resource or memory is unavailable |
| Supported HTTP Methods | GET |
| | Example: GET /cgibin/oreWrite.cgi?classId=715&instance=1&attr=54&dataType=7&value=Some%20String |
| | POST |
| | Example: POST /cgi-bin/oreWrite.cgi |
| | attr: 54 |
| | jciOid: 1071 |
| | dataType: 7 |
| | value: "Some string" |

The navigation tree lookup script 652 may be configured to obtain all of the top level views and their view IDs from the view definition file 630 stored within the controller 510. The navigation tree lookup script 652 may be used by the web server 640 and/or the client device 610 to build a top level navigation tree within a webpage generated by the web server 640. Details of an example navigation tree lookup script 652 are provided in the following table:

| | Navigation Tree Lookup Script |
|---|---|
| Field | Description |
| Standard CGI script name | cgi-bin\navTree.cgi |
| Main function name | WebUI_ViewDef_Read_Navtree |
| Parameters | "internal" -- Example: "internal=0". Specifies whether or not to include views marked as internal only. Defaults to 0 (FALSE). |
| Example output | {ViewId: 1, Name: "Status"}, {ViewId: 3, Name: "Commissioning"}] |
| Possible status codes | 200 OK -- Will receive output similar to the examples above |
| | 400 Bad Request -- Invalid required CGI parameters |
| | 409 Conflict -- System in startup; script cannot yet be invoked. |
| | 500 Internal Server Error -- Resource or memory is unavailable |
| Supported HTTP Methods | GET |
| | Example: GET /cgi-bin/navTree.cgi?internal=0 |
| | POST |
| | Example: POST /cgi-bin/navTree.cgi |
| | internal: 0 |

The view definition tree lookup script 654 may be configured to obtain the view definition for various items that can be selected via a user interface presented on the client device 610. For example, in response to a selection of a particular item via a user interface (e.g., settings, device status, commissioning, etc.), the view definition tree lookup script 654 may retrieve the view definition for the selected item from the view definition file 630 stored on the controller 510. The view definition may include one or more of the data objects 624 specified by the view definition file 630 for the corresponding item. Details of an example view definition tree lookup script 654 are provided in the following table:

| View Definition Tree Lookup Script | |
|---|---|
| Field | Description |
| Standard CGI script name | cgi-bin\viewDef.cgi |
| Main function name | WebUI_ViewDef_Read |
| Parameters | "viewId" -- Example: "viewId=1"<br>"groupId" -- Example: "groupId=65535" (NOTE: 65535 is the "no specific group" value)<br>"getValues" -- Example: "getValues=1". Decides if the value elements found should have their present values determined. |
| Example output | {"level": 1, "Name": "Controller", "groupId": 65535, "Elements": [{"EnumValue": 11, "level": 2, "Name": "Firm", "EnumSet": 1714, "ElementType": 1, "groupId": 1001, "Elements": [{"Attribute": 7004, "Name": "FirmVer", "value": "(NULL)", "ElementType": 0, "datatype": 7, "JCI_OID": 23453, "Writable": 0}, {"Attribute": 7005, "Name": "Firm-S", "rawString": "1727:0", "value": "Firmware Versions OK", "ElementType": 0, "datatype": 9, "JCI_OID": 23453, "rawValue": 0, "Writable": 0}]}, {"EnumValue": 37, "level": 2, "Name": "Time", "EnumSet": 1714, "ElementType": 1, "groupId": 1002, "Elements": [{"Attribute": 7000, "Name": "Time", "value": "10:48:00", "ElementType": 0, "datatype": 11, "JCI_OID": 24018, "Writable": 0}, {"Attribute": 7001, "Name": "Date", "value": "2015-02-25", "ElementType": 0, "datatype": 10, "JCI_OID": 24018, "Writable": 0}, {"Attribute": 7007, "Name": "TimeZone", "rawString": "1731:53", "value": "Central", "ElementType": 0, "datatype": 9, "JCI_OID": 24018, "rawValue": 53, "Writable": 1}]}, {"EnumValue": 19, "level": 2, "Name": "Network", "EnumSet": 1714, "ElementType": 1, "groupId": 1003, "Elements": [{"Attribute": 7009, "Name": "DevName", "value": "UCBApp", "ElementType": 0, "datatype": 7, "JCI_OID": 24013, "Writable": 1}, {"Attribute": 7003, "Name": "BASCom", "rawString": "1724:1", "value": "BACnet", "ElementType": 0, "datatype": 9, "JCI_OID": 24013, "rawValue": 1, "Writable": 0}, {"Attribute": 7010, "Name": "Descrip", "value": "Smart Equipment 2 Stage UCB RTU", "ElementType": 0, "datatype": 7, "JCI_OID": 24013, "Writable": 1}, {"Attribute": 7000, "Name": "Comm-S", "rawString": "302:0", "value": "Not Configured", "ElementType": 0, "datatype": 9, "JCI_OID": 24023, "rawValue": 0, "Writable": 0}, {"Attribute": 7007, "Name": "FcBusMode", "rawString": "1222:4", "value": "Ethernet Field Bus", "ElementType": 0, "datatype": 9, "JCI_OID": 24023, "rawValue": 4, "Writable": 0}, {"Attribute": 7001, "Name": "Address", "value": 0, "ElementType": 0, "datatype": 3, "JCI_OID": 24023, "Writable": 1}, {"Attribute": 7003, "Name": "OprBaudRate", "rawString": "300:0", "value": "Auto", "ElementType": 0, "datatype": 9, "JCI_OID": 24023, "rawValue": 0, "Writable": 0}, {"Attribute": 7004, "Name": "BaudRate", "rawString": "300:0", "value": "Auto", "ElementType": 0, "datatype": 9, "JCI_OID": 24023, "rawValue": 0, "Writable": 1}, {"Attribute": 7002, "Name": "DeviceId", "value": 203, "ElementType": 0, "datatype": 3, "JCI_OID": 24023, "Writable": 1}, {"Attribute": 7008, "Name": "EncodeType", "rawString": "575:0", "value": "ISO 10646 (UCS-2)", "ElementType": 0, "datatype": 9, "JCI_OID": 24023, "rawValue": 0, "Writable": 1}]}, {"EnumValue": 18, "level": 2, "Name": "Misc", "EnumSet": 1714, "ElementType": 1, "groupId": 1004, "Elements": [{"Attribute": 7000, "Name": "Language", "rawString": "1730:0", "value": "1730:0", "ElementType": 0, "datatype": 9, "JCI_OID": 24013, "rawValue": 0, "Writable": 1}, {"Attribute": 7001, "Name": "Units", "rawString": "869:0", "value": "IP", "ElementType": 0, "datatype": 9, "JCI_OID": 24013, "rawValue": 0, "Writable": 1}]}, {"EnumValue": 152, "level": 2, "Name": "SysCntlrs", "EnumSet": 1714, "ElementType": 1, "groupId": 1005, "Elements": [{"EnumValue": 18, "level": 3, "Name": "Misc", "EnumSet": 1714, "ElementType": 1, "groupId": 1006, "Elements": [{"Attribute": 7002, "Name": "Relearn", "rawString": "1793:0", "value": "False", "ElementType": 0, "datatype": 9, "JCI_OID": 24013, "rawValue": 0, "Writable": 1}, {"Attribute": 7029, "Name": "#NetSensors", "value": 0, "ElementType": 0, "datatype": 3, "JCI_OID": 23899, "Writable": 0}, {"Attribute": 7004, "Name": "EconCntlr", "rawString": "1662:0", "value": "Not Present", "ElementType": 0, "datatype": 9, "JCI_OID": 24013, |

| | View Definition Tree Lookup Script |
|---|---|
| Field | Description |
| | "rawValue": 0, "Writable": 0}, {"Attribute": 7005, "Name": "4StgCntlr", "rawString": "1662:0", "value": "Not Present", "ElementType": 0, "datatype": 9, "JCI_OID": 24013, "rawValue": 0, "Writable": 0}, {"Attribute": 7006, "Name": "FDDMCntlr", "rawString": "1662:0", "value": "Not Present", "ElementType": 0, "datatype": 9, "JCI_OID": 24013, "rawValue": 0, "Writable": 0}, {"Attribute": 7007, "Name": "FDDSCntlr", "rawString": "1662:0", "value": "Not Present", "ElementType": 0, "datatype": 9, "JCI_OID": 24013, "rawValue": 0, "Writable": 0}]}, {"EnumValue": 154, "level": 3, "Name": "UCB", "EnumSet": 1714, "ElementType": 1, "groupId": 1007, "Elements": [{"Attribute": 7000, "Name": "UCBMainVer", "value": "4.0.0.1002", "ElementType": 0, "datatype": 7, "JCI_OID": 24028, "Writable": 0}, {"Attribute": 7001, "Name": "UCBAppVer", "value": "11.2.0.1017__2014.8.4.255__13.23.5.0", "ElementType": 0, "datatype": 7, "JCI_OID": 24028, "Writable": 0}, {"Attribute": 7003, "Name": "UCBHardVer", "value": "(NULL)", "ElementType": 0, "datatype": 7, "JCI_OID": 24028, "Writable": 0}]}, {"EnumValue": 8, "level": 3, "Name": "Econ", "EnumSet": 1714, "ElementType": 1, "groupId": 1008, "Elements": [ ]}, {"EnumValue": 155, "level": 3, "Name": "4Stg", "EnumSet": 1714, "ElementType": 1, "groupId": 1009, "Elements": [ ]}, {"EnumValue": 156, "level": 3, "Name": "FDDMstr", "EnumSet": 1714, "ElementType": 1, "groupId": 1010, "Elements": [ ]}, |
| Possible status codes | 200 OK -- Will receive output similar to the examples above<br>400 Bad Request -- Invalid required CGI parameters<br>409 Conflict -- System in startup; script cannot yet be invoked.<br>500 Internal Server Error -- Resource or memory is unavailable |
| Supported HTTP Methods | GET<br>Example: GET /cgibin/viewDef.cgi?viewId=1&groupId=65535&getValues=1<br>POST<br>Example: POST /cgi-bin/viewDef.cgi<br>viewId: 1<br>groupId: 65535<br>getValues: 1 |

Still referring to FIG. 6, the controller is shown to include a HTTP helper task 656 and a server integration library 658. The HTTP helper task 656 may be configured to aid the scripts 643 to communicate with the data objects 624, where most of the data in the controller 510 is stored. In some embodiments, the scripts 643 run within a thread context of the web server 640. The scripts 643 may send messages directly to the data objects 624, and the data objects 624 may send messages back to the scripts 643 via the HTTP helper task 656.

The server integration library 658 may contain a listing of the scripts 643 that are used by the controller 510. In some embodiments, the server integration library 658 is customizable for different types of devices. The listing of scripts 643 provided in the server integration library 658 may define which scripts 643 are downloaded or otherwise obtained by the controller 510 to facilitate the functions of the web server 640. In some embodiments, the server integration library 658 provides SSL certificates and private keys (e.g., if a SSL variant of the web server is being used) to the web server 640. The server integration library 658 may create the configuration for the web server 640. For example, the server integration library 658 may define whether configuration parameters for the web server 640 should be passed as a C structure or if the parameters should be loaded from a text file inside the file system.

Referring now to FIGS. 7-14, a web portal 700 which may be created by a web server, such as the web servers discussed above in connection with FIGS. 5 and 6, and presented on a client device, is shown, according to one embodiment. Advantageously, the configuration of the web server and script engine (as described with reference to FIGS. 5-6) allows a web server to generate a web portal in which none of the data presented via the web portal is hardcoded. For example, all of the data presented via the web portal 700, including the navigation links, may be generated from by script engine (e.g. the script engine 642 of FIG. 6) dynamically. Further, the components listed below in regards to controllers and/or client device may be understood in relation to the controllers and client devices discussed in FIGS. 5 and 6, above.

The data shown in the web portal 700 may be based on the data objects stored in a controller, as defined by a view definition file on the controller, such as described above. This allows the point values presented via the web portal 700 to automatically change if the points on the controller change and/or if the view definition file is changed. Advantageously, this feature allows for the web portal 700 to adapt to different types of devices without changing any features of the web server. A view definition file may define which of the data points are shown in the web interface. Moreover, since a view definition file is used, points can be dynamically hidden and shown to the user based on the current settings of the controller, even as the user is commissioning the device. For example, if the user chooses to enable an economizer control, all of the points related to configuring an economizer control (that were previously hidden) may appear automatically in the web interface, as well as any other connected user interface.

Figure 7:
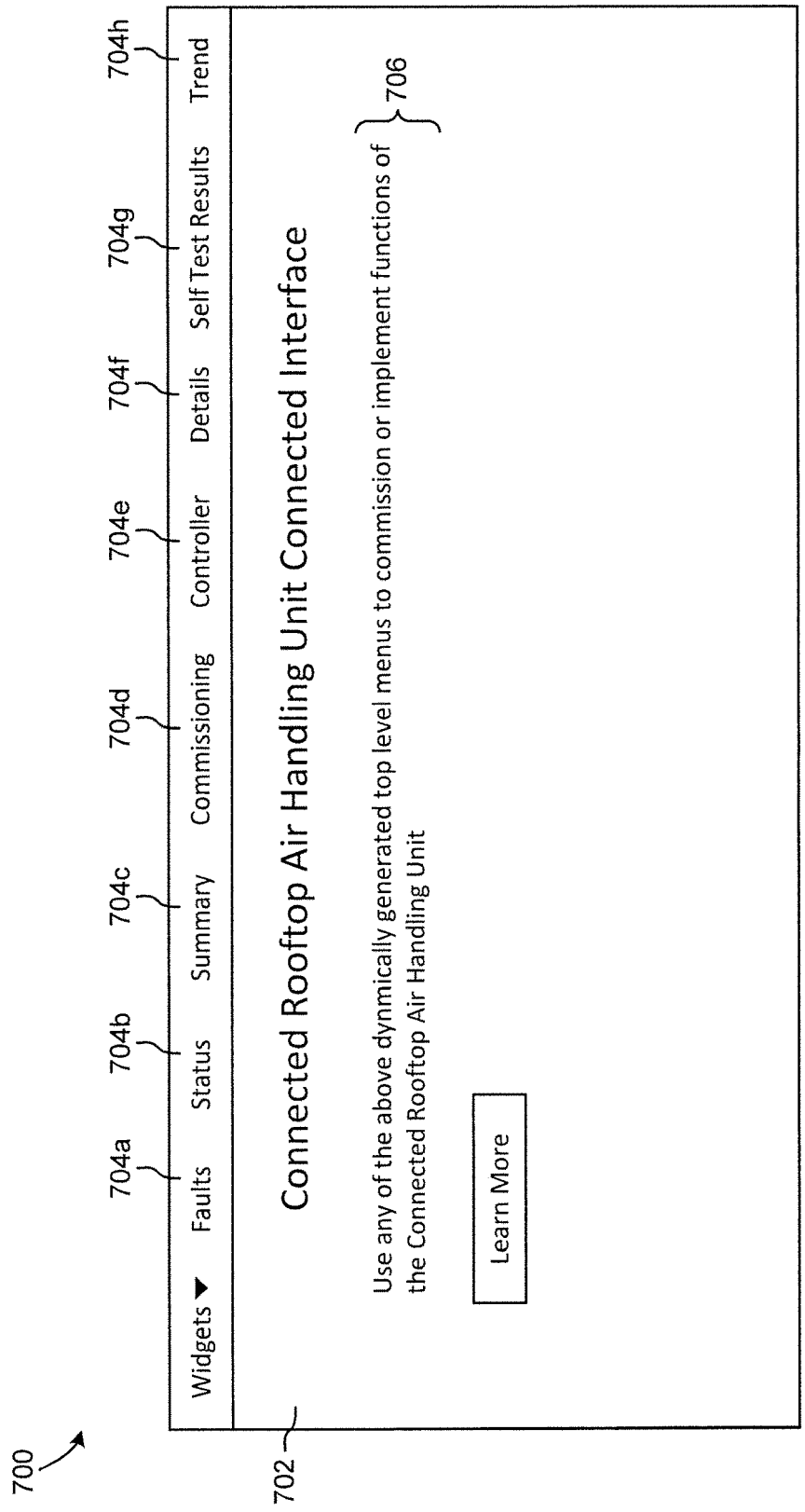
FIG. 7 is a rendering of a main index page of a web portal which may be generated by the system of FIG. 5, according to an exemplary embodiment.
Figure 8:
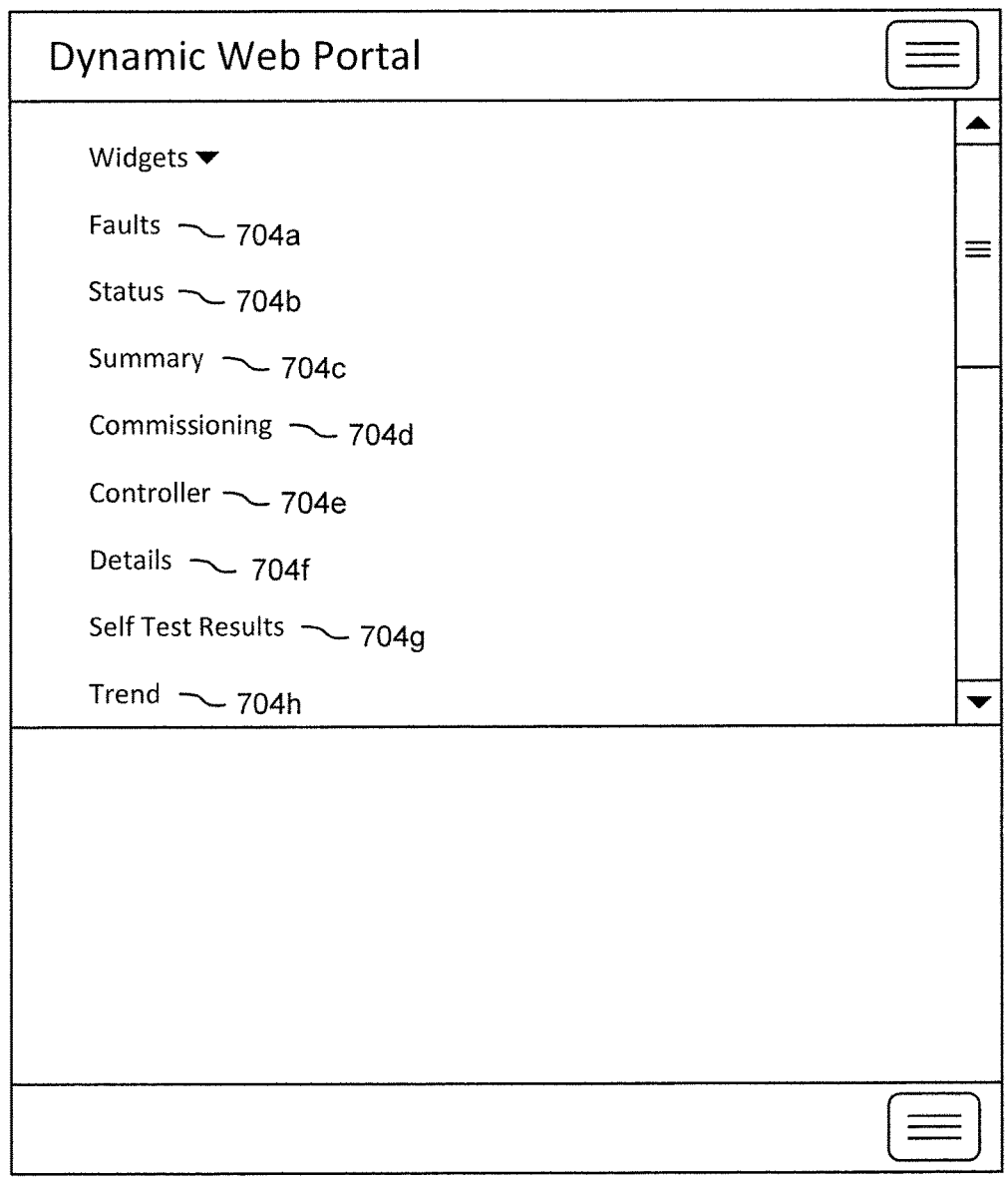
FIG. 8 is a rendering of the main index page of FIG. 7 displayed on a mobile device, according to an exemplary embodiment.

Referring particularly to FIGS. 7-8, a main index page 702 of the web portal 700 is shown, according to one embodiment. When the web portal 700 is initially loaded on a client device, the web portal 700 may use a navigation tree lookup script to get the top level views in the system. This data is shown as selectable items 704a-704h (e.g., hyperlinks, navigation links, etc.) along the top of the main index page 702 (as shown in FIG. 7). The selectable items 704a-704h displayed at the top of the main index page 702 may be defined by a view definition file. If a client device is a mobile device (e.g., a smartphone, a tablet, etc.) the main index page may be displayed in a roll-up menu 800 (as shown in FIG. 8), while still maintaining the selectable items 704a-704h. As shown in FIGS. 7-8, the selectable items 704a-704h can refer to "faults," "status," "summary," "commissioning," "controller," "details," "self test results," and "trend," respectively. However, it is contemplated that the web portal 700 can include additional or fewer selectable items as applicable. Further, the selectable items 704a-704h are dynamically generated, and therefore will be specific for the individual controller and/or BMS device. As shown in FIGS. 7-8, the web portal 700 is shown as relating to a "Connected Rooftop Air Handling Unit;" however, it is contemplated that the web portal 700 can be dynamically configured to provide for user interaction with any connected BMS device, such as those described above. Further, the main index page 702 can provide general instructions 706 to provide guidance to a user when first interfacing with a given device using the web portal 700.

Figure 9:
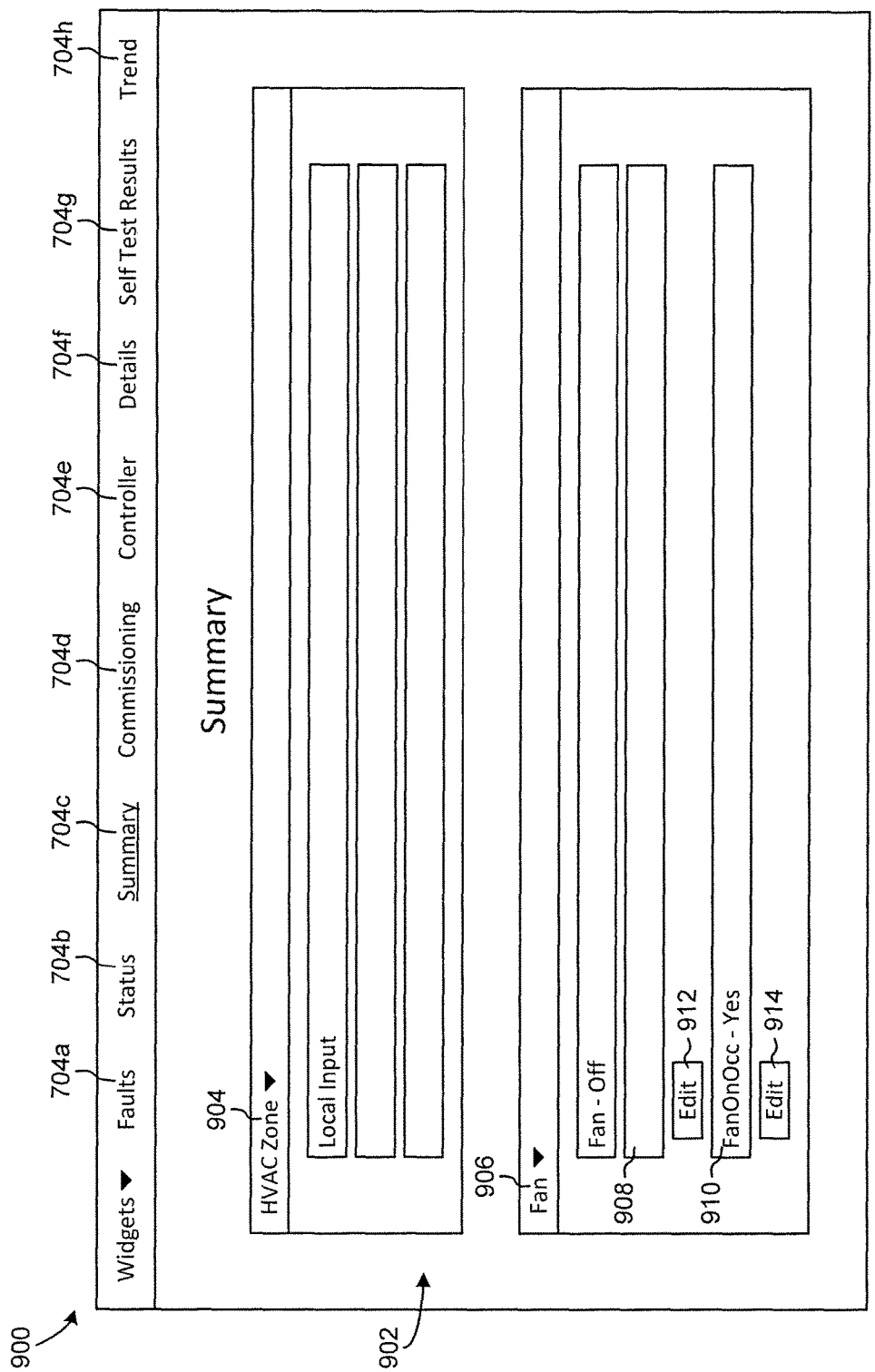
FIG. 9 is a rendering of a view page of the web portal of FIG. 7, according to an exemplary embodiment.

Referring now to FIG. 9, an example view page 900 of the web portal 700 is shown, according to one embodiment. The view page 900 may be displayed when one of the selectable items 704a-704h displayed on the main index page 702 is selected. For example, in response to a user selecting one of the selectable items 704a-704h, a client device may execute a view definition tree lookup script to get the selected view from a controller. The data defined by the view definition file for the chosen selectable items 704a-704h may be retrieved from the data objects stored in a controller (e.g., by executing the read object script) and organized as a tree in the web portal 700. The tree may contain present values of any leaf nodes in the tree. As shown in FIG. 9, the "summary" selectable item 704a is selected and shown on the view page 900. The view page 900 includes the tree 902, and two leaf zones 904, 906. The leaf zones 904, 906 can be related to an HVAC Zone and a fan of the connected rooftop air handling unit described above.

In some embodiments, the view page 900 displays one or more editable values 908, 910. Whether a value is editable may be defined a data template of the associated controller, as described above. If a value is editable, an edit button 912, 914 may be displayed along with the editable value 908, 910. In some embodiments, the web portal 700 supports editing three data types: floats, enumerations, and strings. However, in some embodiments, other data types may be editable. When the edit button 912, 914 is selected for any editable value 908, 910 in the view page 900, the appropriate editor may be launched to allow the user to input the desired value. As shown in FIG. 9, editable values include the fan type 908 and the fan status 910.

Figure 10:
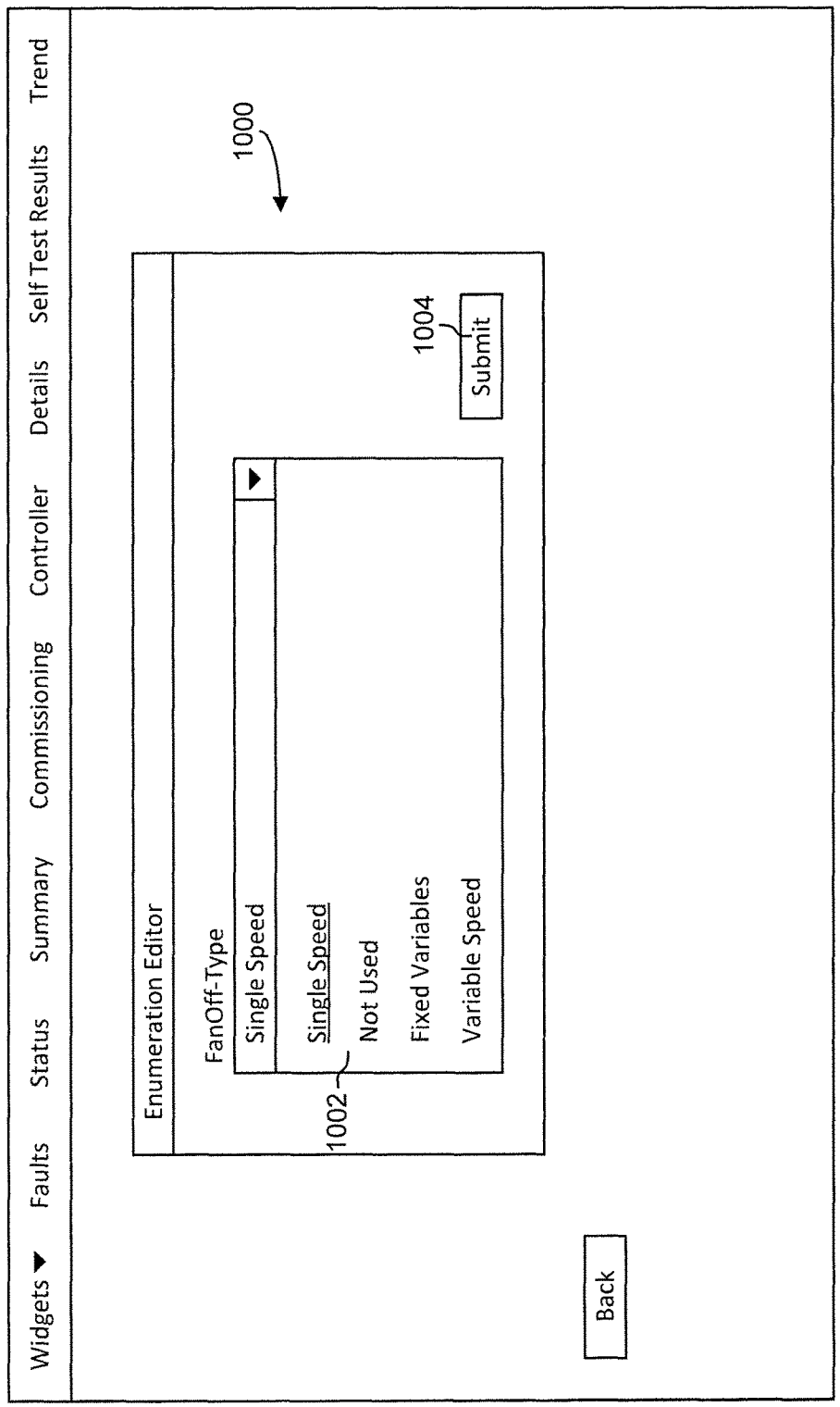
FIG. 10 is a rendering of an enumeration editor page of the web portal of FIG. 7, according to an exemplary embodiment.

Referring now to FIG. 10, an enumeration editor page 1000 of the web portal 700 is shown, according to one embodiment. The enumeration editor page 1000 may be displayed in response to a user selecting the edit button 912, 914 associated with any editable values 908, 910 in the web portal 700. As shown in FIG. 10, the enumeration editor page 1000 is displayed in relation to the fan type value 908 described above. In one example, the enumeration editor 1000 may select the present value for display in the list automatically. Selecting a drop down menu 1002 may allow the user to select any of the values in the drop down menu 1002. When the enumeration editor page 1000 is loaded, an associated web server may submit a request to an equipment model for all of the enumeration values and associated translated strings. The web server may then use the enumerated values returned by the equipment model to populate the drop down menu 1002 in the enumeration editor page 1000. In one embodiment, a dictionary script, as described above, converts the enumerated value to a preferred language on the associated controller before being displayed on the web portal 700. Thus, any translation of the enumerated value is done on a controller (e.g. the controller 510 of FIGS. 5 and 6) prior to being presented to a client device. The preferred language may be selected by a user when first accessing the web portal 700. Alternatively, the web portal 700 may be able to determine the preferred language by looking at the default language used on a client device.

The user can select any value in the drop down menu 1002 and then select the submit button 1004 to write the value to the editable value 908. For example, FIG. 10 shows the selected value in the drop down menu 1002 as the "single speed" value, for the fan type 908 editable value described above. Selecting the submit button 1004 may trigger a write object script to write the selected value back to a corresponding data object stored in a controller. If the write is successful, the web portal 700 may automatically return to the view page 900 that was displayed prior to selecting the edit button 912. The view page 900 may display the new value of the point that was just edited. If the write is not successful, an error message may be displayed near the dropdown menu 1002 (e.g., below the dropdown menu 1002) in the web portal 700.

Figure 11:
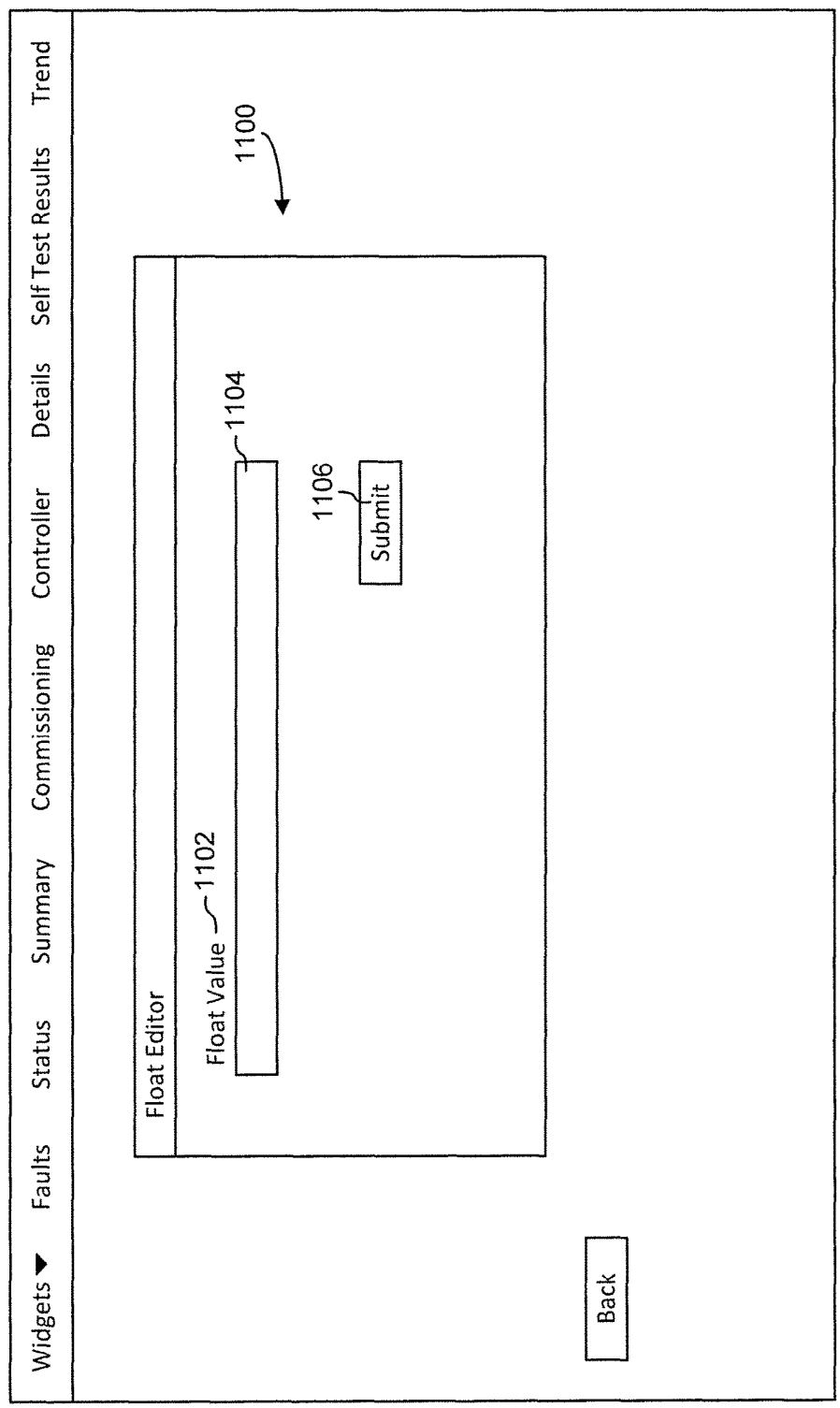
FIG. 11 is a rendering of a float editor page of the web portal of FIG. 7, according to an exemplary embodiment.

Referring now to FIG. 11, a float editor page 1100 of the web portal 700 is shown, according to one embodiment. The float editor page 1100 may be displayed in response to a user selecting an edit button associated with any float value in the web portal 700. The float editor page 1100 may function in a similar manner as described with reference to the enumeration editor page 1000. For example, the float editor page 1100 may load the present value of an editable float value 1102 by default. The user can then type in any float value they wish into an input box 1104 and click a submit button 1106. Clicking the submit button 1106 may trigger a write object script to write the selected value back to the corresponding data object stored in an associated controller. If the value is accepted, the user may be redirected back to the appropriate view page (i.e., view page that was displayed prior to selecting the edit button). If unsuccessful, an error message may be displayed.

Figure 12:
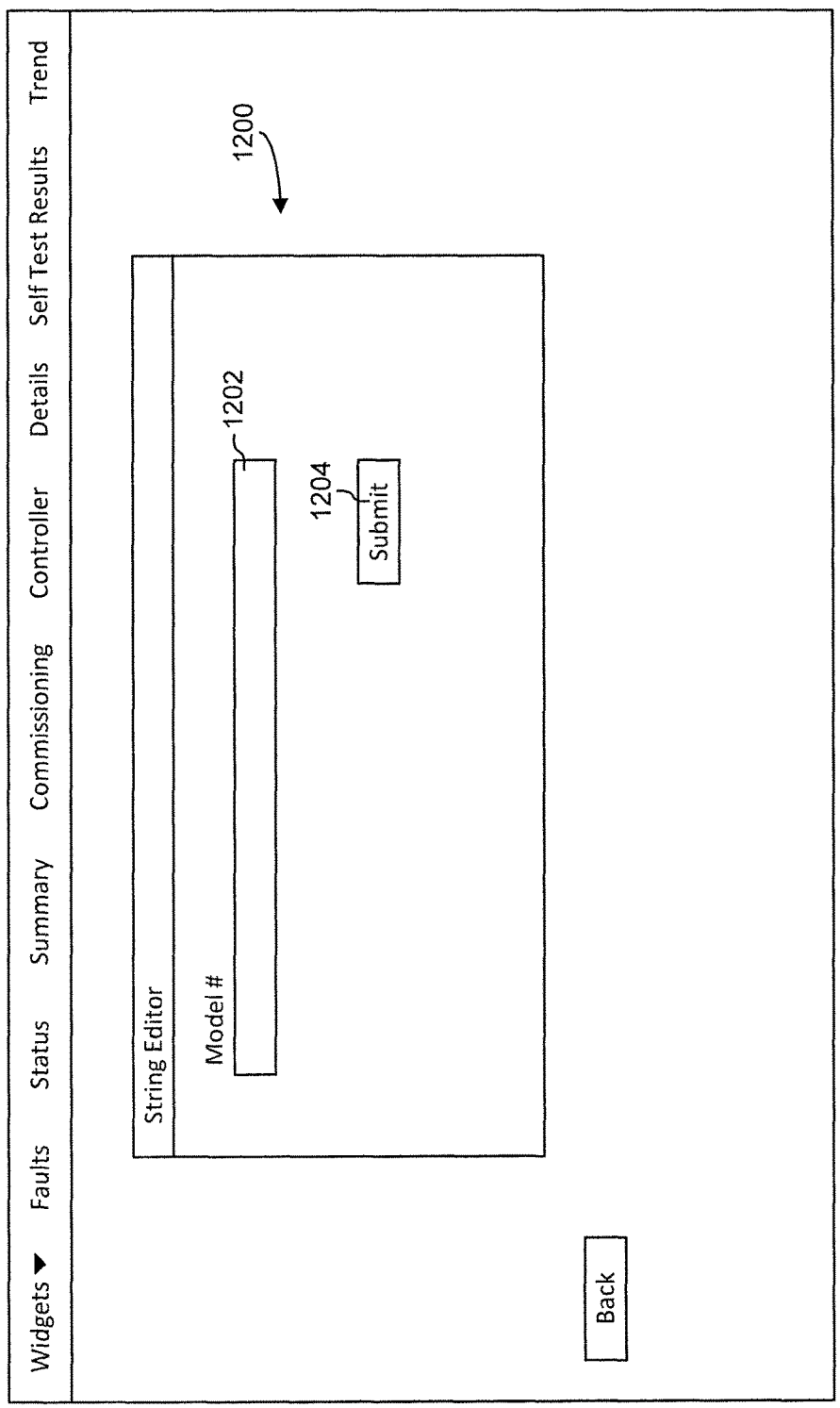
FIG. 12 is a rendering of a string editor page of the web portal of FIG. 7, according to an exemplary embodiment.

Referring now to FIG. 12, a string editor page 1200 of the web portal 700 is shown, according to one embodiment. The string editor page 1200 may be displayed in response to a user selecting an edit button associated with any string value in the web portal 700. The string editor page 1200 may be substantially the same as the float editor page 1100. Much like the enumeration editor page 1000 and the float editor page 1100, the user can enter a string into the text field 1202 displayed on the string editor page 1200 and click a submit button 1204. Clicking the submit button may trigger a write object script to write the selected value back to a corresponding data object stored in an associated controller. If the string value is accepted, the user may be redirected back to the appropriate view page. If unsuccessful, an error message may be displayed.

Referring now to FIGS. 13-14, a fault viewer page 1300 of the web portal 700 is shown, according to one embodiment. The fault viewer page 1300 may be displayed in response to a user selecting the "fault" selectable item 704a in the web portal 700. Selecting the fault item 704a may trigger a read object script to read the faults from a fault data object stored in an associated controller. In some embodiments, a read object script retrieves a predetermined number of faults for display via the fault viewer page 1300 (e.g., the newest five active faults in the system). In the embodiment shown in FIG. 13, there are three active faults 1302, 1304, 1306 shown on the fault viewer page 1300 related to the associated controller. Selecting any of the displayed faults 1302, 1304, 1306 may cause detailed information on the fault to be displayed in a fault detail page 1400, as shown in FIG. 14. The fault detail page can include contextual information and/or data regarding the selected fault, such as fault text 1402, fault time stamp 1404 and fault severity 1406. The fault text 1402 can be a descriptive text string describing the nature of the fault. In one embodiment, the fault text 1402 is provided as a string. In one embodiment, a dictionary script, as described above, converts fault text 1402 string to a preferred language for display on the web portal 700, as described above. The fault time stamp 1406 can provide an indication of when the fault occurred. Finally, the fault severity 1406 can provide a level of severity via the web portal. In one embodiment, the fault severity 1406 can be selected enumerated values such as "low," "high," and/or "critical." However, other enumerated values are considered.

In some embodiments, the web portal 700 is configured to display trend data. Trend data can be retrieved from a controller using a read object script and displayed via the web portal 700. In some embodiments, the web portal 700 is configured to graphically display the trend data. For example, the web portal 700 may include executable instructions (e.g., HTML code, script code, etc.) that causes the web portal 700 to arrange the trend data in a graphical format (e.g., based on the timestamps and data values associated with the data points). Multiple trends may be displayed on the same webpage simultaneously to allow a user to easily compare data points.

Figure 15:
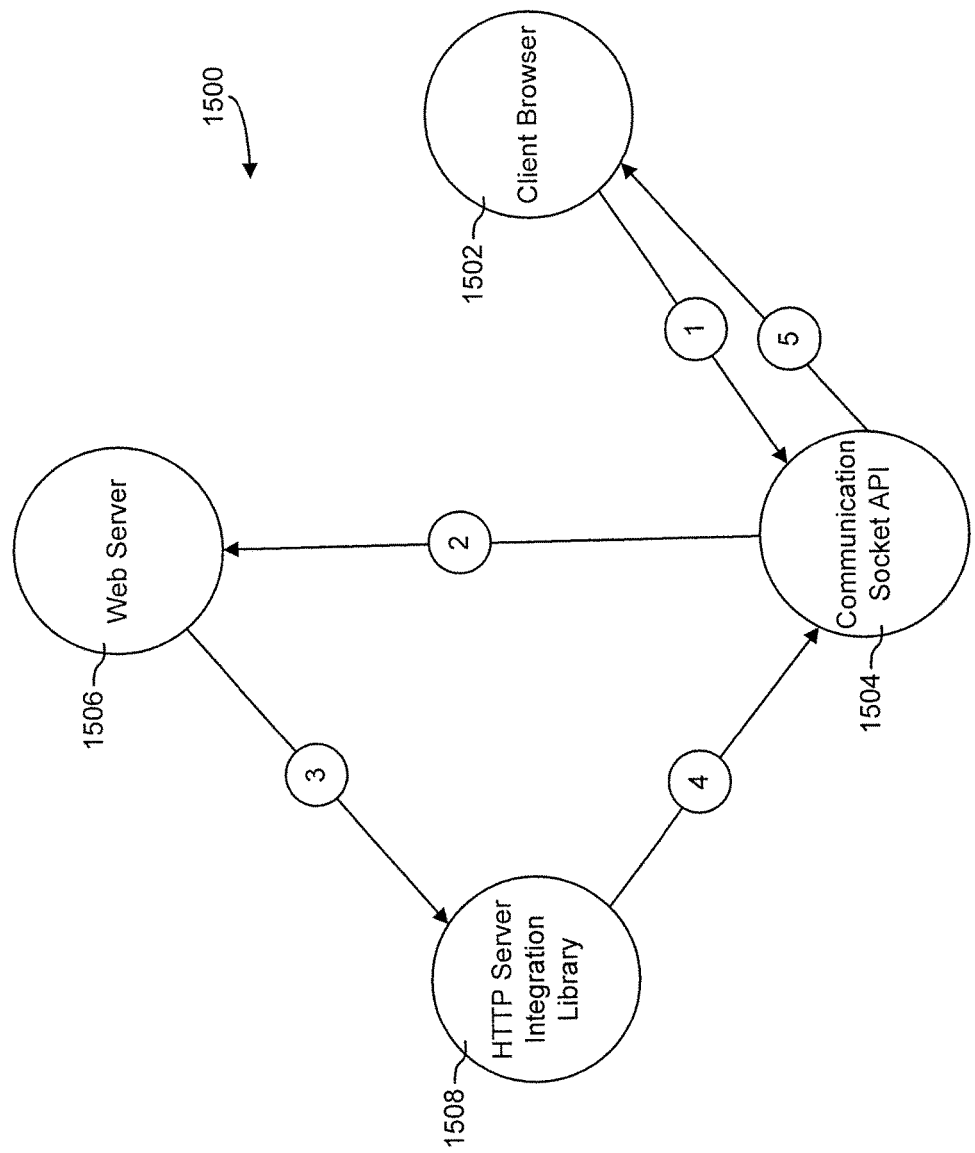
FIG. 15 is a flow diagram illustrating communications between various components of the controller of FIG. 6 and the client device, according to an exemplary embodiment.

Referring now to FIG. 15, a flow diagram illustrating a process 1500 for generating a web portal between a controller and the client device is shown, according to one embodiment. As shown in FIG. 15, the client browser 1502 running on a client device transmits a data request to a communications socket application program interface (API) 1504. The communication socket API 1504 receives the data request from the client browser 1502. In one embodiment, the communication socket API 1504 is a component of the controller of FIG. 6. For example, the communication socket API 1504 can be contained within the communication interface 604 of FIG. 6. Such data requests may include webpages, commissioning information, device information, scripts, etc. The communication socket API 1504 passes the received data request to the web server 1506 (e.g., the web server 640 of FIG. 6). The web server 1506 can provide encryption services (e.g. SSL) to remove existing encryption from the received data request. The data request can then be processed by an HTTP server integration library 1508. In one embodiment, the HTTP server integration library 1508 is the server integration library 658 of FIG. 6. The HTTP server integration library 1508 can invokes a script (e.g. a CGI script) to process the received data request. For example, the HTTP server integration library 1508 could invoke one or more of the scripts described in FIG. 6, above. Further the HTTP server integration library 1508 can provide product specific data in response to the data request. The HTTP server integration library 1508 then sends the processed results to the communication socket API 1504, which can then communicate the processed results to the client browser 1502 for viewing. The processed results can include one or more scripts and/or product specific data, in addition to other data, such as HTTP headers for proper communication packaging. In one embodiment, the communication socket API 1504 can encrypt the processed data prior to transmitting the processed data to the client browser 1502.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for a rooftop air handling unit, the controller comprising:
one or more processors; and
one or more non-transitory computer-readable media storing instructions that, when executed by the one or more processors, cause the one or more processors to perform operations comprising:
executing control logic to generate a control signal for the rooftop air handling unit using values for one or more variables monitored by the controller;
linking, via an equipment model, each of the one or more variables used in the control logic with a corresponding set of data objects associated with the rooftop air handling unit, the data objects identifying real-time value of the corresponding variables;
identifying, via a view definition, a subset of the set of data objects of the equipment model;
dynamically generating, via a web server, a web portal displaying the real-time values of the variables corresponding to the subset of the set of data objects identified by the view definition; and
providing, via a communications interface, the web portal to a client device.

2. The controller of claim 1, wherein the operations further comprise identifying, via a template data file, one or more of the data objects as being relevant to a function performed by the controller.

3. The controller of claim 1, wherein the web portal includes one or more HTML webpages configured to be rendered by a web browser running on the client device.

4. The controller of claim 1, wherein the operations further comprise providing, via the web server, a plurality of Common Gateway Interface (CGI) scripts to the client device in conjunction with the web portal.

5. The controller of claim 4, wherein the CGI scripts include at least one of a dictionary script, a faults script, a read object script, a write object script, a navigation tree lookup script, and a view definition tree lookup script.

6. The controller of claim 4, wherein one or more of the CGI scripts are executed by the controller when the client device requests a top level view from the controller, wherein the top level view is displayed as a page of the web portal.

7. The controller of claim 6, wherein the controller accesses the view definition to identify one or more of the data objects and uses the identified data objects to populate navigation headings in the top level view.

8. The controller of claim 4, wherein the CGI scripts are executed by the controller when the client device requests a view of one or more data points in response to a selection of a navigation heading via the web portal, wherein the one or more data points are displayed on a page of the web portal.

9. The controller of claim 8, wherein the controller accesses the view definition to identify one or more of the data objects related to the selected navigation heading and extracts the data points from the identified data objects.

10. The controller of claim 1, wherein the view definition comprises a hierarchy of the subset of the set of data objects configured to provide a navigation tree that is displayed by the web portal.

11. The controller of claim 1, wherein the view definition file further identifies a desired format for displaying the real-time values of the variables within the web portal.

12. The controller of claim 11, further comprising a dictionary configured to convert the real-time values of the variables to the desired format for display on the web portal.

13. An HVAC device controller configured to dynamically generate a web portal, the HVAC device controller comprising:
a processing circuit, the processing circuit comprising:
a memory storing instructions; and
a processor configured to execute the instructions to:
execute control logic to generate a control signal for an HVAC device using values for one or more variables monitored by the HVAC device controller;
link, via an equipment model, each of the one or more variables used in the control logic with a corresponding set of data objects associated with the HVAC device, the data objects identifying real-time values of the corresponding variables; and
identify, via a view definition file, a subset of the set of data objects of the equipment model;
dynamically generating, via a web server, a web portal, the web portal including the real-time values of the variables corresponding to the subset of the set of data objects identified by the view definition file; and
transmitting, via a communications interface, the web portal and at least one of a plurality of scripts to a client device.

14. The HVAC device controller of claim 13, wherein the data objects comprise at least one of data points, faults, control parameters and settings.

15. The HVAC device controller of claim 13, wherein the scripts include at least one of a dictionary script, a fault script, a read object script, a write object script, a navigation tree lookup script and a view definition tree lookup script.

16. The HVAC device controller of claim 13, wherein the view definition file comprises a hierarchy of the subset of the set of data objects configured to provide a navigation tree that is displayed by the web portal.

17. The HVAC device controller of claim 13, wherein the view definition further identifies a desired format for displaying the real-time values of the variables within the web portal.

18. The HVAC device controller of claim 17, further comprising a dictionary configured to convert the real-time values of the variables to the desired format for display on the web portal.

* * * * *